(12) United States Patent
Kishimoto et al.

(10) Patent No.: US 11,614,841 B2
(45) Date of Patent: Mar. 28, 2023

(54) ELECTRONIC APPARATUS AND METHOD FOR MANUFACTURING THE SAME

(71) Applicant: Samsung Display Co., Ltd., Yongin-Si (KR)

(72) Inventors: Hirotsugu Kishimoto, Hwaseong-si (KR); Dasom Gu, Asan-si (KR); Yongchan Jeon, Cheonan-si (KR); Hyun-Been Hwang, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 106 days.

(21) Appl. No.: 17/340,311

(22) Filed: Jun. 7, 2021

(65) Prior Publication Data

US 2022/0043538 A1 Feb. 10, 2022

(30) Foreign Application Priority Data

Aug. 6, 2020 (KR) .................. 10-2020-0098656

(51) Int. Cl.
*G06F 3/044* (2006.01)
*G06F 1/16* (2006.01)

(52) U.S. Cl.
CPC .......... *G06F 3/0446* (2019.05); *G06F 1/1641* (2013.01)

(58) Field of Classification Search
CPC .............................. G06F 3/0446; G06F 1/1641
See application file for complete search history.

(56) References Cited

U.S. PATENT DOCUMENTS

| 2016/0009056 | A1* | 1/2016 | Watanabe | ............. B32B 27/365 |
| | | | | 264/129 |
| 2017/0080680 | A1* | 3/2017 | Lee | ........................ G06F 1/1652 |
| 2019/0129553 | A1 | 5/2019 | Oh et al. | |
| 2019/0267430 | A1 | 8/2019 | Choi et al. | |
| 2021/0397221 | A1 | 12/2021 | Hwang et al. | |

FOREIGN PATENT DOCUMENTS

| JP | 6511994 B2 | 5/2019 |
| KR | 100639817 B1 | 10/2006 |
| KR | 1020190047168 A | 5/2019 |
| KR | 1020190101584 A | 9/2019 |
| KR | 1020210157946 A | 12/2021 |

* cited by examiner

*Primary Examiner* — Robert J Michaud
(74) *Attorney, Agent, or Firm* — Cantor Colburn LLP

(57) ABSTRACT

Provided is an electronic apparatus including a window, a display panel disposed below the window, a digitizer disposed below the display panel and including a first surface and a second surface opposing the first surface, a first adhesive layer disposed on the first surface, and a second adhesive layer disposed below the second surface, wherein the first adhesive layer and the second adhesive layer are two-time-cured. Accordingly, an electronic apparatus having improved folding and viewability properties may be provided.

20 Claims, 16 Drawing Sheets

ELECTRONIC APPARATUS AND METHOD FOR MANUFACTURING THE SAME

This application claims priority to Korean Patent Application No. 10-2020-0098656, filed on Aug. 6, 2020, and all the benefits accruing therefrom under 35 U.S.C. § 119, the content of which in its entirety is herein incorporated by reference.

BACKGROUND

The present disclosure herein relates to an electronic apparatus and a method for manufacturing the same, and more particularly, to an electronic apparatus having improved reliability and a method for manufacturing the same.

In the information society, the importance of electronic apparatuses as a transmission medium for visual information has come to the fore. A display device included in the electronic apparatus includes a liquid crystal display ("LCD"), a plasma display panel ("PDP"), an organic light emitting display ("OLED"), a field effect display ("FED"), an electrophoretic display ("EPD"), etc.

The electronic apparatus receives electrical signals so as to be activated. The display apparatus includes a detection sensor that detects inputs applied from outside a display panel for displaying an image.

The display apparatus may include various electrode patterns so as to be activated through electrical signals. Areas where the electrode patterns are activated display information or respond to signals applied from the outside.

SUMMARY

The present disclosure provides an electronic apparatus having improved reliability of a detection sensor that detects external inputs.

The present disclosure also provides a method for manufacturing an electronic apparatus having improved viewability and folding properties.

An embodiment of the inventive concept provides an electronic apparatus including a window, a display panel disposed below the window, a digitizer disposed below the display panel and including a first surface and a second surface opposing the first surface, a first adhesive layer disposed on the first surface, and a second adhesive layer disposed below the second surface. A third surface of each of the first adhesive layer and the second adhesive layer is flatter than a fourth surface of each of the first adhesive layer and the second adhesive layer, the fourth surface faces the digitizer, and the third surface is opposite to the fourth surface.

The first adhesive layer and the second adhesive layer each may have a storage modulus of about 0.01 megapascals (MPa) to about 5 MPa at −20 degrees in Celsius (° C.).

The first adhesive layer and the second adhesive layer each may have a thickness of about 10 micrometers (μm) to about 50 μm in a thickness direction.

The electronic apparatus may further include a first sub-adhesive layer disposed on the first adhesive layer, wherein the first sub-adhesive layer may have a lower storage modulus than the first adhesive layer.

The first sub-adhesive layer may have a storage modulus of about 0.01 MPa to about 1 MPa at −20° C.

The sum of the thicknesses of the first sub-adhesive layer and the first adhesive layer may be about 10 μm to about 50 μm in the thickness direction.

The electronic apparatus may further include a second sub-adhesive layer disposed below the second adhesive layer, wherein the second sub-adhesive layer may have a lower storage modulus than the second adhesive layer.

The second sub-adhesive layer may have a storage modulus of about 0.01 MPa to about 1 MPa at −20° C.

The sum of the thicknesses of the second sub-adhesive layer and the second adhesive layer may be about 10 μm to about 50 μm in the thickness direction.

The digitizer may include a plurality of first sensing coils and a plurality of second sensing coils.

The electronic apparatus may further include a shielding layer disposed below the second adhesive layer, wherein the shielding layer may include magnetic metal powder.

The electronic apparatus may include a folding area that is foldable with respect to a virtual folding axis extending in one direction, a first non-folding area extending from a first side of the folding area, and a second non-folding area extending from a second side of the folding area, and the first side may be opposite to the second side.

The electronic apparatus may further include at least one of an input sensing panel and an optical member, and the at least one may be disposed between the window and the display panel.

The electronic apparatus may further include at least one of a lower film and a cushion layer, and the at least one may be disposed below the display panel.

In an embodiment of the inventive concept, an electronic apparatus includes a window, a display panel disposed below the window, a first sub-adhesive layer disposed below the display panel, a first adhesive layer disposed below the first sub-adhesive layer, a second adhesive layer disposed below the first adhesive layer, and a digitizer disposed between the first adhesive layer and the second adhesive layer, wherein the first sub-adhesive layer has a lower storage modulus than the first adhesive layer.

The electronic apparatus may further include a second sub-adhesive layer disposed below the second adhesive layer, wherein the second sub-adhesive layer may have a lower storage modulus than the second adhesive layer.

In an embodiment of the inventive concept, a method for manufacturing an electronic apparatus includes disposing a display panel below a window, and disposing a detection sensor unit below the display panel. The disposing of the detection sensor unit includes stacking a digitizer between a first adhesive layer in a semi-cured state and a second adhesive layer in a semi-cured state, increasing flatness of a first surface of each of the first adhesive layer and the second adhesive layer, where a second surface of each of the first adhesive layer and the second adhesive layer faces the digitizer, and the first surface is opposite to the second surface, and providing light to the first adhesive layer and the second adhesive layer for full-curing.

The increasing of the flatness of the first adhesive layer and the second adhesive layer may include providing heat to the first adhesive layer and the second adhesive layer.

The method for manufacturing an electronic apparatus may further include forming a first sub-adhesive layer on the first adhesive layer.

The method for manufacturing an electronic apparatus may further include forming a second sub-adhesive layer below the second adhesive layer.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1A:
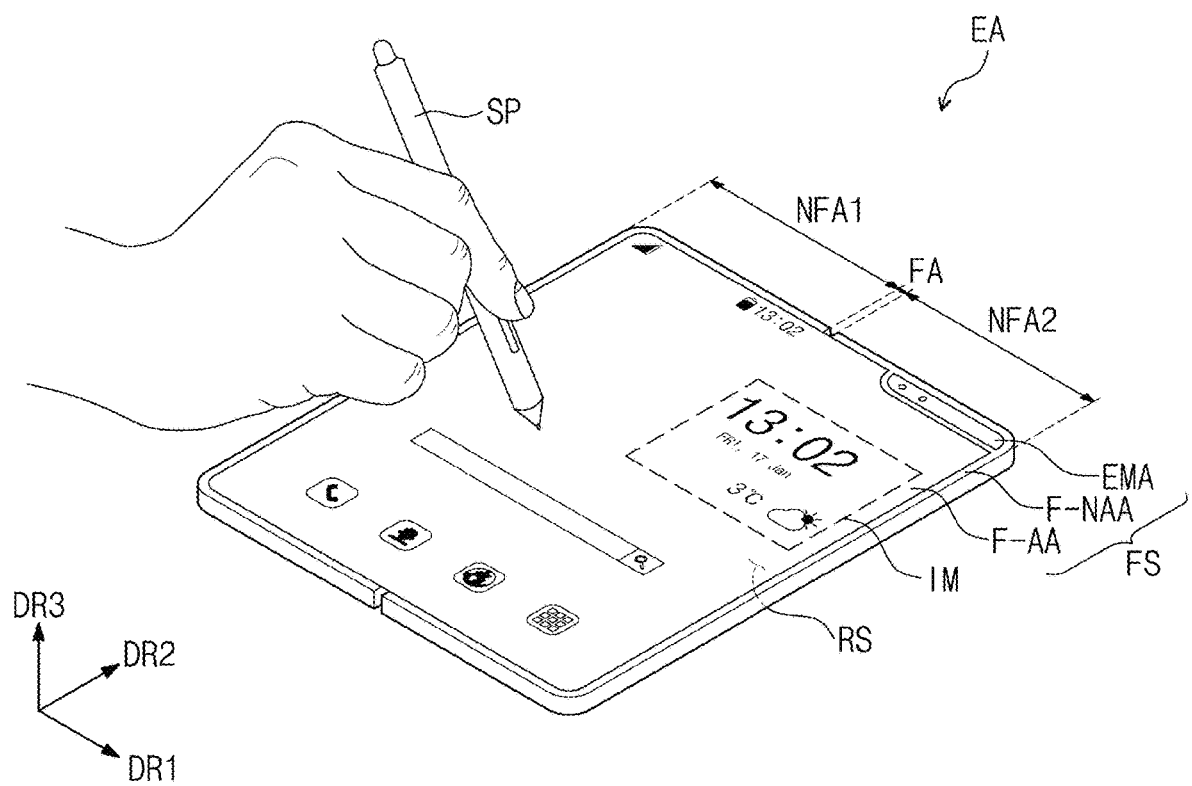
FIG. 1A is a perspective view of an electronic apparatus in an unfolded state according to an embodiment of the inventive concept.

In the present description, when an element (or a region, a layer, a portion, etc.) is referred to as being "on," "connected to," or "coupled to" another element, it means that the element may be directly disposed on/connected to/coupled to the other element, or that a third element may be disposed therebetween.

Like reference numerals refer to like elements. Also, in the drawings, the thickness, the ratio, and the dimensions of elements are exaggerated for an effective description of technical contents.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." The term "and/or," includes all combinations of one or more of which associated configurations may define.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concept. The terms of a singular form may include plural forms unless the context clearly indicates otherwise.

In addition, terms such as "below," "lower," "above," "upper," and the like are used to describe the relationship of the configurations shown in the drawings. The terms are used as a relative concept and are described with reference to the direction indicated in the drawings.

Unless otherwise defined, all terms (including technical and scientific terms) used herein have the same meaning as commonly understood by one of ordinary skill in the art to which the inventive concept pertains. It is also to be understood that terms defined in commonly used dictionaries should be interpreted as having meanings consistent with the meanings in the context of the related art, and are expressly defined herein unless they are interpreted in an ideal or overly formal sense.

It should be understood that the terms "comprise", or "have" are intended to specify the presence of stated features, integers, steps, operations, elements, components, or combinations thereof in the disclosure, but do not preclude the presence or addition of one or more other features, integers, steps, operations, elements, components, or combinations thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30 percentages (%), 20%, 10% or 5% of the stated value. In the present description, "the configuration of B is directly disposed on the configuration of A" indicates that no separate adhesive layers and adhesive members are disposed between the configuration of A and the configuration of B.

Hereinafter, embodiments of the inventive concept will be described with reference to the accompanying drawings.

Figure 1B:
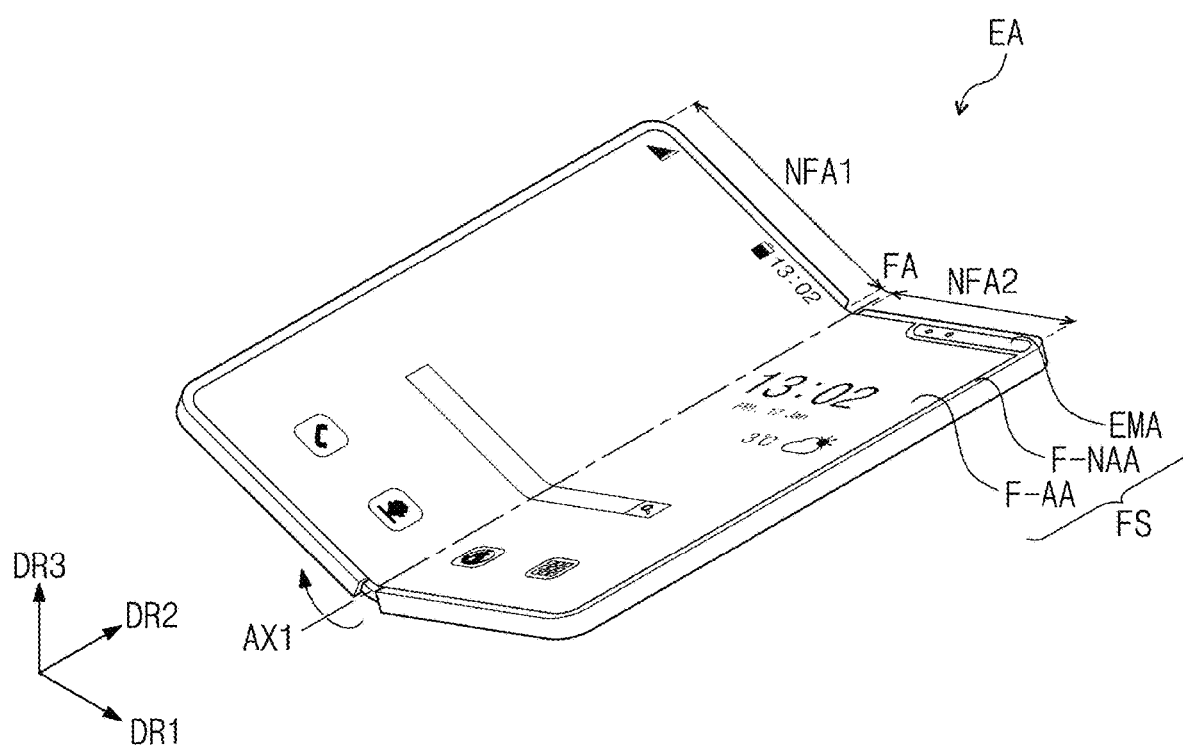
FIG. 1B is a perspective view of an electronic apparatus according to an embodiment of the inventive concept.
Figure 1C:
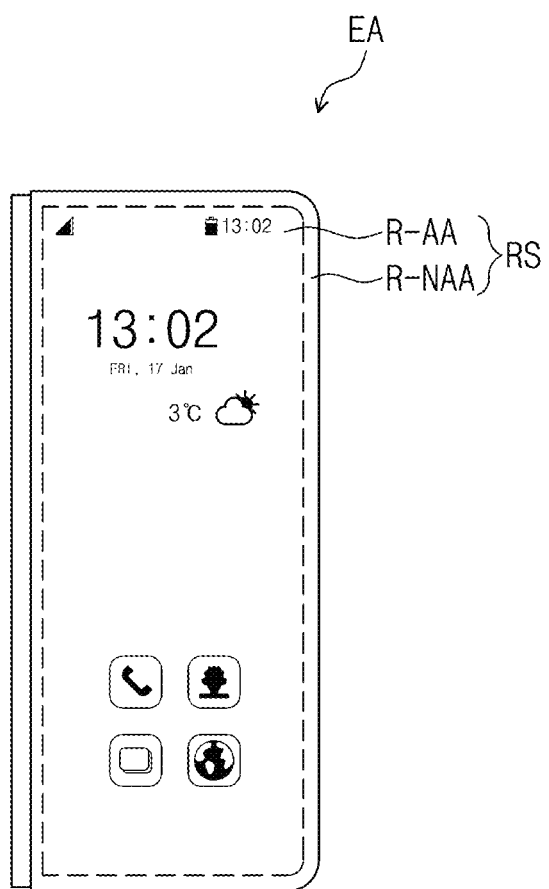
FIG. 1C is a plan view of an electronic apparatus in a folded state according to an embodiment of the inventive concept.
Figure 1D:
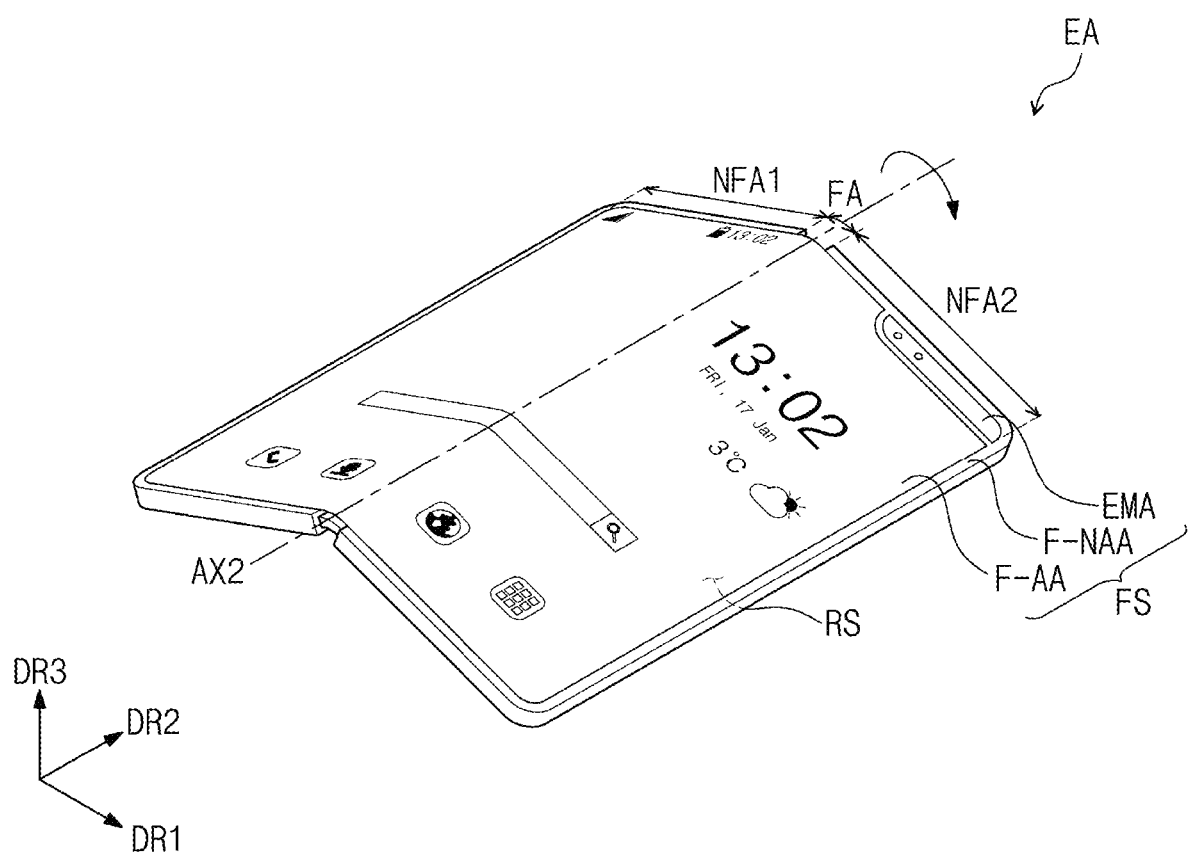
FIG. 1D is a perspective view of an electronic apparatus according to an embodiment of the inventive concept.

FIG. 1A is a perspective view of an electronic apparatus in an unfolded state according to an embodiment of the inventive concept. FIG. 1B is a perspective view of an electronic apparatus according to an embodiment of the inventive concept. FIG. 1C is a plan view of an electronic apparatus in a folded state according to an embodiment of the inventive concept. FIG. 1D is a perspective view of an electronic apparatus according to an embodiment of the inventive concept.

Referring to FIG. 1A, an electronic apparatus EA may be a device activated according to electrical signals. The electronic apparatus EA may include various embodiments. For example, the electronic apparatus EA may include a tablet, a laptop, a computer, a smart television, etc. In the present embodiment, a smartphone is exemplarily illustrated as the electronic apparatus EA.

The electronic apparatus EA may display an image IM towards a third direction DR3 on a first display surface FS parallel to a first direction DR1 and a second direction DR2, respectively. The first display surface FS displaying the image IM may correspond to a front surface of the electronic apparatus EA. The image IM may include a still image as well as a dynamic image. FIG. 1A illustrates an Internet search window and a watch window as an example of the image IM.

In the present embodiment, a front surface (i.e., an upper surface) and a rear surface (i.e., a lower surface) of respective members are defined with respect to a direction in which the image IM is displayed. Front and rear surfaces may oppose each other in a third direction DR3 and the normal direction of each of the front and rear surfaces may be parallel to the third direction DR3.

The distance of a layer between the front and rear surfaces in the third direction DR3 may correspond to the thickness/height in the third direction DR3 of the layer of the electronic apparatus EA. The directions indicated by the first to third directions DR1, DR2, and DR3 are relative concepts, and may thus be changed to other directions.

The electronic apparatus EA may detect external inputs applied from the outside. The external inputs may include various forms of inputs provided from outside the electronic apparatus EA.

In an embodiment, for example, the external inputs may include external inputs applied when approaching the electronic apparatus EA or being adjacent by a predetermined distance (e.g., hovering), as well as contact by a part of a body such as a user's hand. In addition, the external inputs may have various forms such as force, pressure, temperature, light, etc.

FIG. 1A illustrates an external input through a user's pen SP as an example. Although not shown, the pen SP may be mounted or detached inside or outside the electronic apparatus EA, and the electronic apparatus EA may provide and receive signals corresponding to the mounting and detachment of the pen SP.

The electronic apparatus EA according to the present embodiment may include a first display surface FS and a second display surface RS. The first display surface FS may include a first active area F-AA, a first peripheral area F-NAA, and an electronic module area EMA. The second display surface RS may be defined as a surface facing at least a portion of the first display surface FS.

The first active area F-AA may be an area activated according to electrical signals. The first active area F-AA is an area displaying an image IM and sensing various forms of external inputs. The first peripheral area F-NAA is adjacent to the first active area F-AA. The first peripheral area F-NAA may have a predetermined color. The first peripheral area F-NAA may surround the first active area F-AA. Accordingly, the shape of the first active area F-AA may be substantially defined by the first peripheral area F-NAA. However, this is illustrated as an example, and the first peripheral area F-NAA may be disposed adjacent to only one side of the first active area F-AA, or may be omitted in other embodiments. An electronic apparatus according to an embodiment of the inventive concept may include various embodiments, and is not limited to any one embodiment.

The electronic module area EMA may have various electronic modules disposed. For example, the electronic module may include at least any one among a camera, a speaker, a light detection sensor, and a heat detection sensor. The electronic module area EMA may detect an external subject received through the display surfaces FS and RS, or provide sound signals such as voice to the outside through the display surfaces FS and RS. The electronic module may include a plurality of components, and is not limited to any one embodiment.

The electronic module area EMA may be surrounded by the first active area F-AA and the first peripheral area F-NAA. However, the embodiment of the inventive concept is not limited thereto, and the electronic module area EMA may be disposed in the first active area F-AA, but is not limited to any one embodiment.

The electronic apparatus EA according to the present embodiment may include at least one folding area FA and a plurality of non-folding areas NFA1 and NFA2 extending from the folding area FA. The non-folding areas NFA1 and NFA2 may be disposed to be spaced apart from each other with the folding area FA therebetween.

Referring to FIG. 1B, an electronic apparatus EA according to an embodiment includes a virtual first folding axis AX1 extending in the second direction DR2. The first folding axis AX1 may extend along the second direction DR2 on the first display surface FS. In the present embodiment, the non-folding areas NFA1 and NFA2 may extend from the folding area FA with the folding area FA therebetween. For example, the first non-folding area NFA1 may extend along one side of the folding area FA in the first direction DR1, and the second non-folding area NFA2 may extend along the other side of the folding area FA in the first direction DR1.

The electronic apparatus EA may be foldable with respect to the first folding axis AX1 to become in-folded such that one area overlapping the first non-folding area NFA1 and the other area overlapping the second non-folding area NFA2 on the first display surface FS face each other.

FIG. 1C illustrates the electronic apparatus EA in a completely in-folded state. Referring to FIG. 1C, in the electronic apparatus EA according to an embodiment, the second display surface RS may be viewed in an in-folded state by a user. In this case, the second display surface RS may include a second active area R-AA displaying an image. The second active area R-AA may be an area activated according to electrical signals. The second active area R-AA is an area displaying an image and sensing various forms of external inputs.

The second peripheral area R-NAA is adjacent to the second active area R-AA. The second peripheral area R-NAA may have a predetermined color. The second peripheral area R-NAA may surround the second active area R-AA. In addition, although not shown, the second display surface RS may further include an electronic module area in which an electronic module including various components is disposed, and is not limited to any one embodiment.

Referring to FIG. 1D, an electronic apparatus EA according to an embodiment includes a virtual second folding axis AX2 extending in the second direction DR2. The second folding axis AX2 may extend along the second direction DR2 on the second display surface RS.

The electronic apparatus EA may be foldable with respect to the second folding axis AX2 to become out-folded such that one area overlapping the first non-folding area NFA1 and the other area overlapping the second non-folding area NFA2 on the second display surface RS face each other.

However, the embodiment of the inventive concept is not limited thereto, and the electronic apparatus EA may be folded with respect to a plurality of folding axes such that portions of each of the first display surface FS and the second display surface RS may face each other, and the number of folding axes and the number of the corresponding non-folding areas according to the invention are not limited to any one.

Figure 2A:
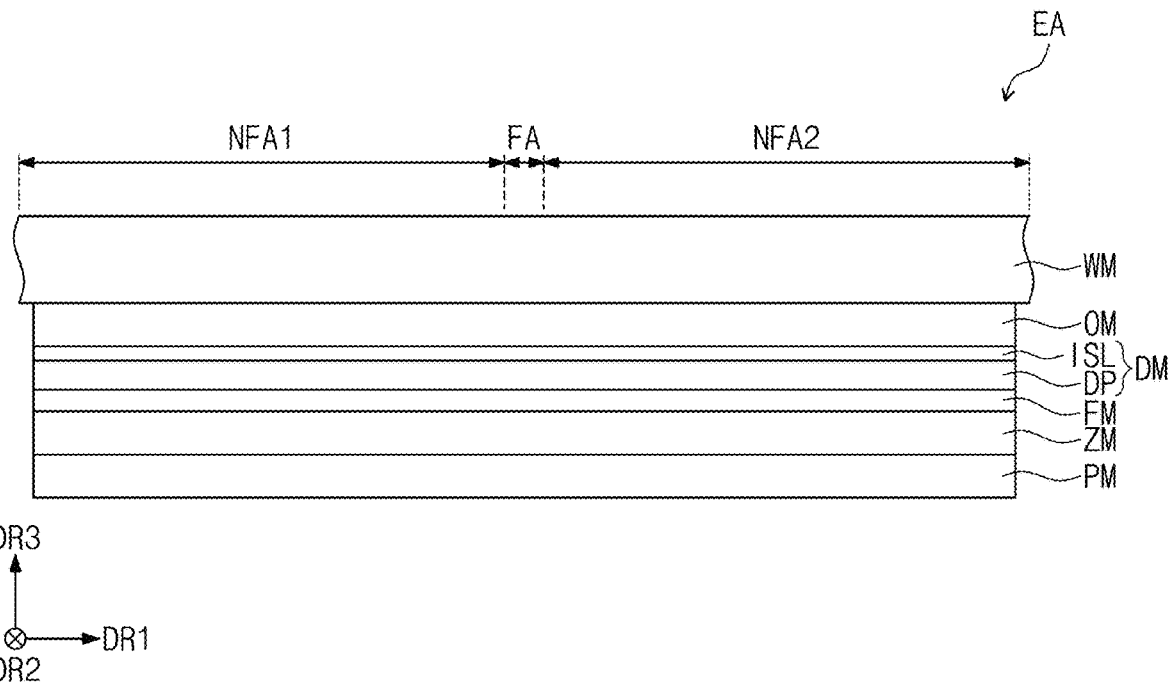
FIG. 2A is a cross-sectional view of an electronic apparatus according to an embodiment of the inventive concept.
Figure 2B:
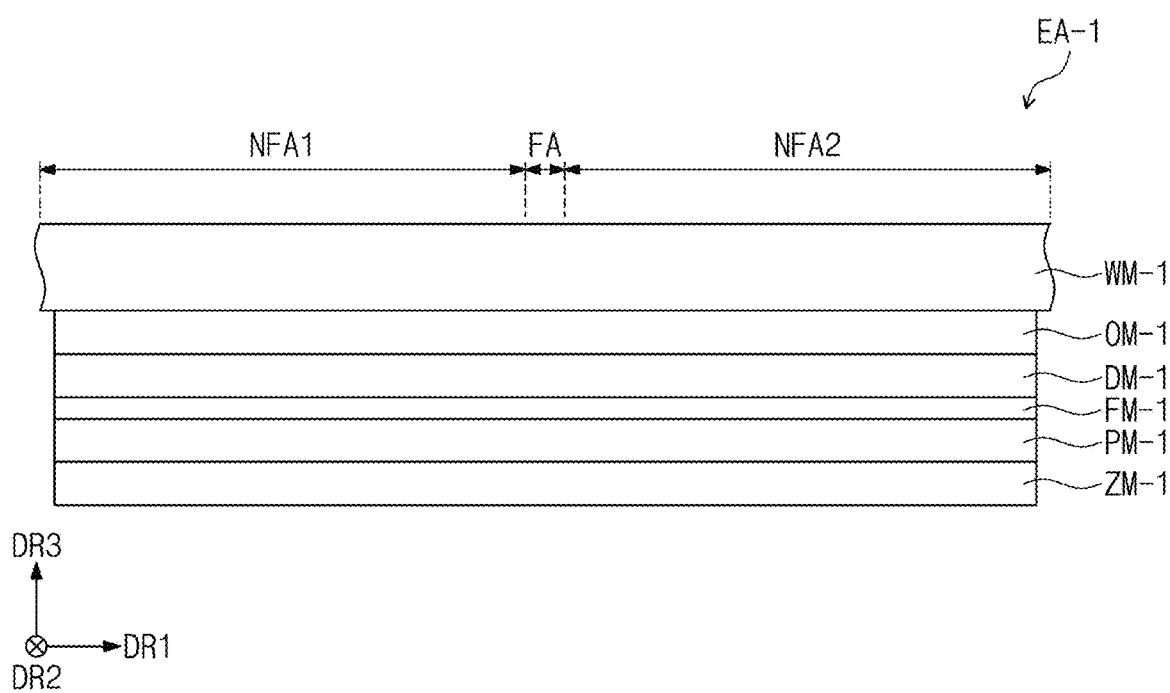
FIG. 2B is a cross-sectional view of an electronic apparatus according to another embodiment of the inventive concept.

FIG. 2A is a cross-sectional view of an electronic apparatus according to an embodiment of the inventive concept. FIG. 2B is a cross-sectional view of an electronic apparatus according to another embodiment of the inventive concept.

Figure 2C:
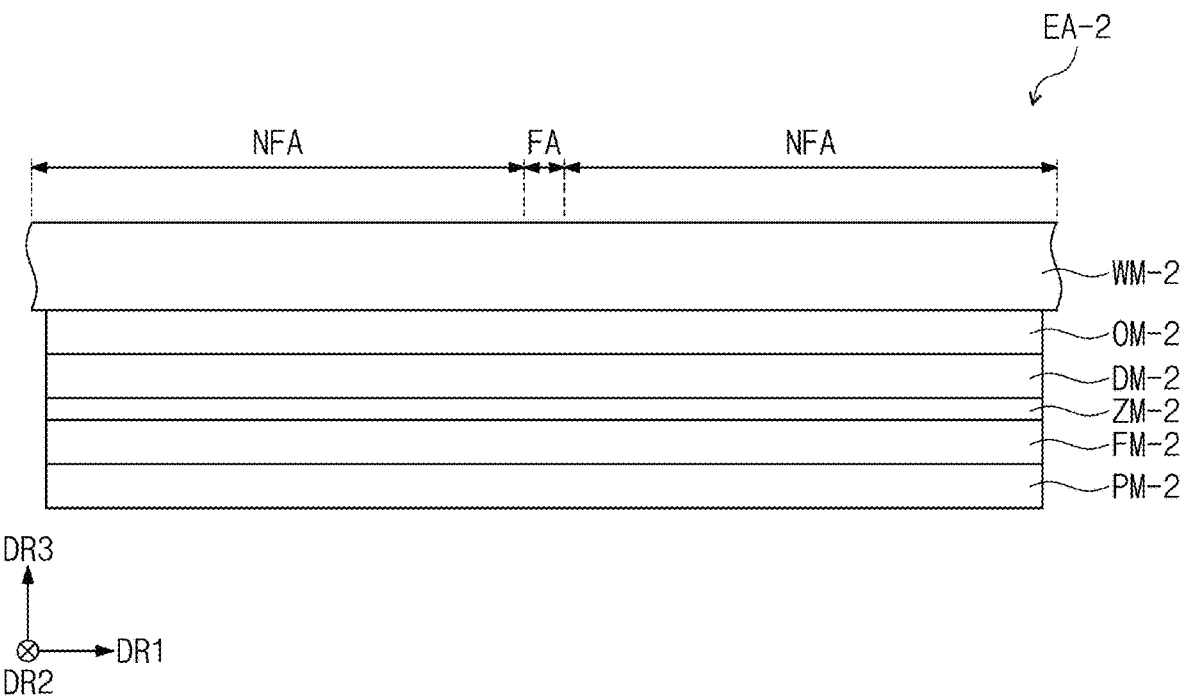
FIG. 2C is a cross-sectional view of an electronic apparatus according to still another embodiment of the inventive concept.

FIG. 2C is a cross-sectional view of an electronic apparatus according to still another embodiment of the inventive concept.

Referring to FIG. 2A, an electronic apparatus EA according to the present embodiment may include a window WM, an optical member OM, a display module DM, a lower film FM, a detection sensor unit ZM, and a protection member PM.

The window WM is disposed on the display module DM. The window WM provides display surfaces FS and RS of the electronic apparatus EA, and protects the display module DM. The window WM may include a material having high light transmittance. For example, the window WM may include a glass substrate, a sapphire substrate, or a plastic film. The window WM may have a multi-layer structure or a single-layer structure. For example, the window WM may have a stack structure in which a plurality of plastic films is bonded through an adhesive, or may have a stack structure in which a glass substrate and a plastic film are bonded through an adhesive.

An area of the window WM through which light generated from the display module DM is transmitted may be defined as a first active area F-AA of the first display surface FS, and a bezel area of the window WM may be defined as a first peripheral area F-NAA. Another set of the structure shown in FIG. 2A may be disposed in the rear surface (i.e., the lower surface) of the electronic apparatus EA with an upside-down manner. In the another set of the structure, an area of the window WM through which light generated from the display module DM is transmitted may be defined as a second active area R-AA of the second display surface RS. The bezel area of the window WM may be defined as a second peripheral area R-NAA.

Although not shown, the window WM may further include functional layers protecting the window WM thereon. For example, the functional layers may include at least any one of an anti-fingerprint layer or a shock absorbing layer, and the invention is not limited to any one embodiment.

The optical member OM is disposed below the window WM. The optical member OM may reduce reflectance of external light of the display module DM with respect to light incident on the display module DM. For example, the optical member OM may include at least any one among an anti-reflection film, a polarizing film, a color filter, and a gray filter.

The display module DM may function as an output device. For example, the display module DM may display an image in the active areas F-AA and R-AA, and a user may obtain information through the image. In addition, the display module DM may function as an input device that detects external inputs applied to the active areas F-AA and R-AA. The display module DM according to an embodiment may include a display panel DP and an input sensing panel ISL.

The lower film FM is disposed below the display module DM. The lower film FM may reduce stress applied to the display module DM when the electronic apparatus EA is folded. In addition, the lower film FM may prevent external moisture from penetrating into the display module DM and absorb external shocks.

The lower film FM may include a plastic film as a base layer. The lower film FM may include a plastic film including any one selected from the group consisting of polyethersulfone ("PES"), polyacrylate, polyetherimide ("PEI"), polyethylene naphthalate ("PEN"), polyethylene terephthalate ("PET"), polyphenylene sulfide ("PPS"), polyarylate, polyimide ("PI"), polycarbonate ("PC"), poly(arylene ethersulfone), and a combination thereof.

Materials forming the lower film FM according to the invention are not limited to plastic resins, and may include organic/inorganic composite materials in another embodiment. The lower film FM may include a porous organic layer and an inorganic material filled in the pores of the organic layer.

The detection sensor unit ZM is disposed below the display module DM. The detection sensor unit ZM may include a digitizer ZL (FIG. 5) to detect signals transmitted through the pen SP (see FIG. 1A) among external inputs. A description of the detection sensor unit ZM will be described later.

The protection member PM is disposed below the display module DM. The protection member PM may include at least one functional layer protecting the display module DM. The functional layer, for example, may be a light blocking layer, a heat dissipation layer, or a cushion layer.

The light blocking layer may serve to prevent components disposed on the display module DM from being viewed through the active areas F-AA and R-AA. Although not illustrated, the light blocking layer may include a binder and a plurality of pigment particles dispersed therein. The pigment particles may include carbon black, etc. The electronic apparatus EA according to an embodiment includes the protection member PM having the light blocking layer, and may thus have enhanced light blocking properties.

The heat dissipation layer may effectively dissipate heat generated from the display module DM. The heat dissipation layer may include at least any one among graphite, copper (Cu), and aluminum (Al), which have excellent heat dissipation properties, and is not limited thereto. The heat dissipation layer may not only enhance heat dissipation properties, but also have electromagnetic wave shielding or electromagnetic wave absorption properties.

The cushion layer may be a synthetic resin foam. The cushion layer may include matrix and define a plurality of voids (i.e., empty spaces). The cushion layer may have elasticity and a porous structure.

The matrix may include a flexible material. The matrix may include a synthetic resin. For example, the matrix may include at least any one among acrylonitrile butadiene styrene copolymer ("ABS"), polyurethane ("PU"), polyethylene ("PE"), ethylene vinyl acetate ("EVA"), and polyvinyl chloride ("PVC").

A plurality of voids defined in the cushion layer easily absorbs shocks applied to the cushion layer. The plurality of voids may be defined the porous structure of the cushion layer.

However, the embodiment of the inventive concept is not limited thereto, and at least any one among the light blocking layer in another embodiment, the heat dissipation layer, and the cushion layer may be omitted, and a plurality of layers may be provided as a single layer, and the embodiment of the inventive concept is not limited thereto.

The electronic apparatus EA according to the present embodiment may have a structure in which a protection member PM, a detection sensor unit ZM, a lower film FM, a display module DM, an optical member OM, and a window WM are sequentially stacked in the third direction DR3.

Although not shown, the components included in the electronic apparatus EA may be bonded through an adhesive layer disposed between the components. Hereinafter, the adhesive layer to be described in the inventive concept may be optical clear adhesive ("OCA"), optical clear resin ("OCR"), or pressure sensitive adhesive ("PSA"). In addition, the adhesive layer may include a photocurable adhesive material or a thermosetting adhesive material, and the material is not particularly limited.

Components included in electronic apparatuses EA-1 and EA-2 of FIGS. 2B and 2C may have the same configuration as those described in FIG. 2A except for several aspects, and differences according to the stacking order will only be described.

Referring to FIG. 2B, the electronic apparatus EA-1 according to the present embodiment may have a structure in which a detection sensor unit ZM-1, a protection member PM-1, and a lower film FM-1, a display module DM-1, an optical member OM-1, and a window WM-1 are sequentially stacked along the third direction DR3.

Referring to FIG. 2C, the electronic apparatus EA-2 according to the present embodiment may have a structure in which a protection member PM-2, a lower film FM-2, a detection sensor unit ZM-2, a display module DM-2, an optical member OM-2, and a window WM-2 are sequentially stacked along the third direction DR3.

Figure 3A:
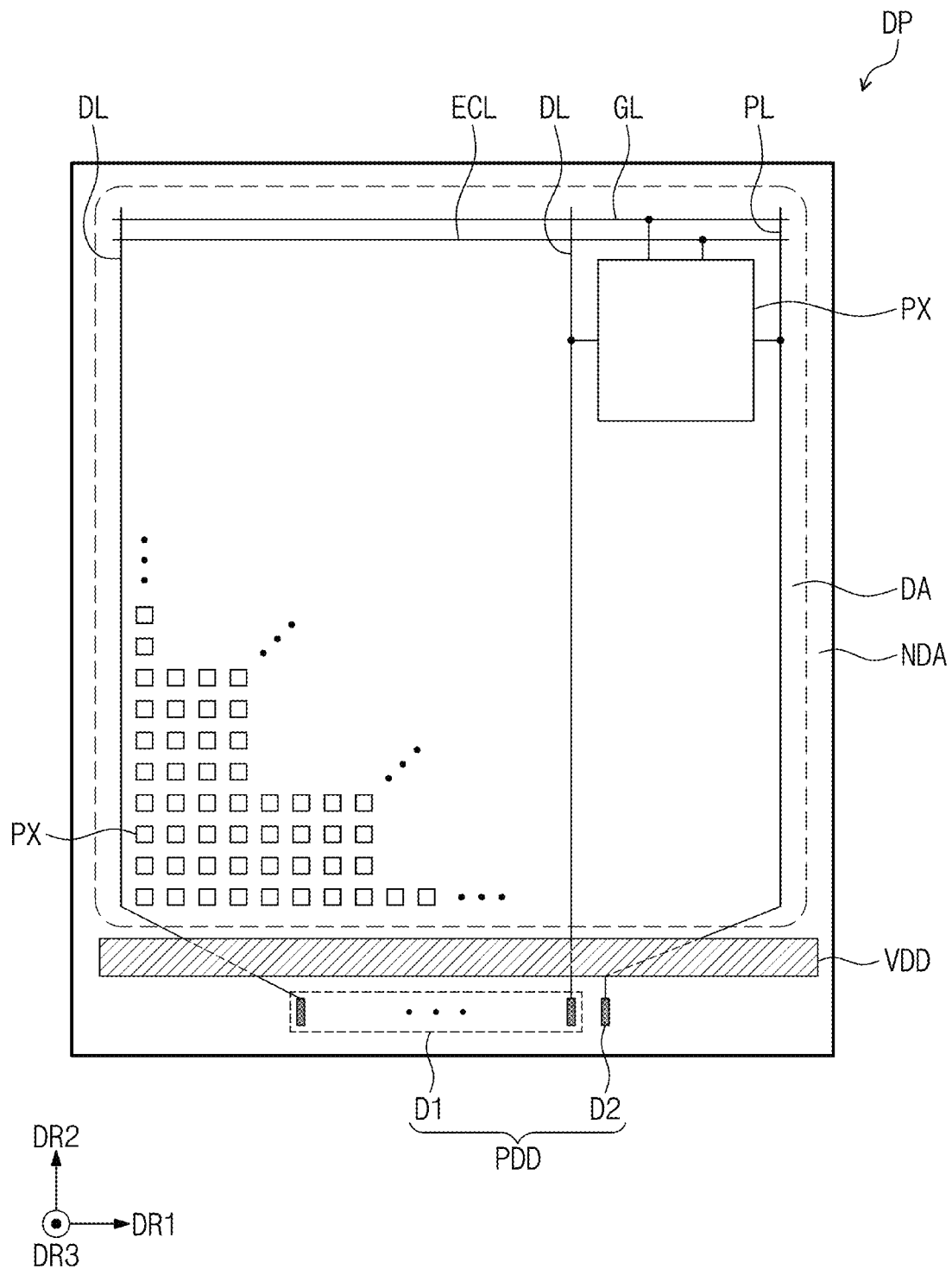
FIG. 3A is a plan view of a display panel according to an embodiment of the inventive concept.
Figure 3B:
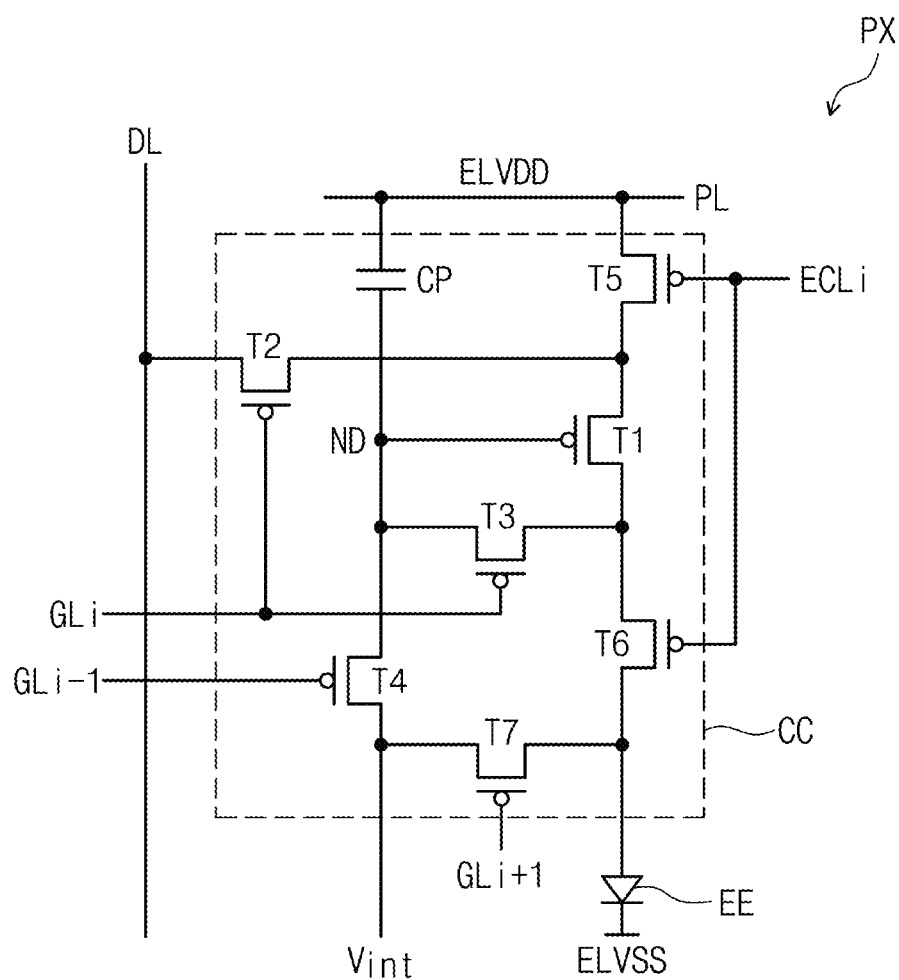
FIG. 3B is an equivalent circuit diagram of pixels according to an embodiment of the inventive concept.
Figure 4:
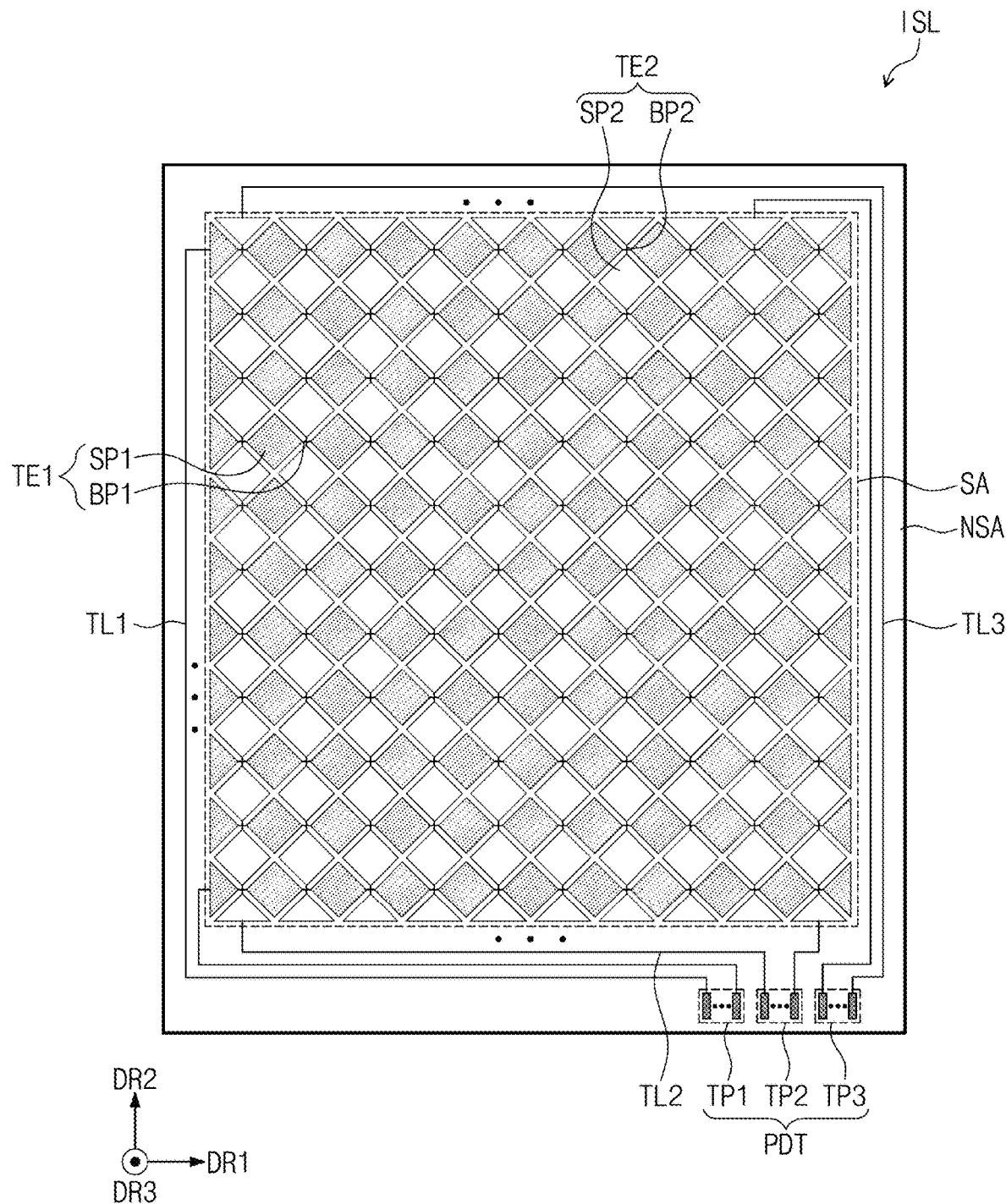
FIG. 4 is a plan view of an input sensing panel according to an embodiment of the inventive concept.

FIG. 3A is a plan view of a display panel DP according to an embodiment of the inventive concept. FIG. 3B is an equivalent circuit diagram of a pixel PX according to an embodiment of the inventive concept. FIG. 4 is a plan view of an input sensing panel ISL according to an embodiment of the inventive concept. The same reference numerals are given for the same configurations as in FIGS. 1A to 2C, and redundant descriptions are omitted.

Referring to FIG. 3A, the display panel DP may include a plurality of pixels PX, a plurality of signal lines GL, DL, PL, and ECL, and a plurality of display pads PDD.

A display area DA of the display panel DP is an area displaying an image IM, and a non-display area NDA may be an area in which a driving circuit or a driving line is disposed. The display area DA may overlap at least a portion of the active areas F-AA and R-AA of the electronic apparatus EA. In addition, the non-display area NDA may overlap the peripheral areas F-NAA and R-NAA of the electronic apparatus EA.

The plurality of signal lines GL, DL, PL, and ECL may be connected to the pixels PX to transmit electrical signals to the pixels PX. Among the signal lines included in the display panel DP, a scan line GL, a data line DL, a power line PL, and a light emitting control line ECL are exemplarily illustrated. However, this is presented as an example, and the signal lines GL, DL, PL, and ECL may further include an initialization voltage line, and are not limited to any one embodiment.

The pixels PX may be arranged to be spaced apart from each other along the first direction DR1 and the second direction DR2 to have a matrix shape on a plane.

Referring to FIG. 3B, an enlarged signal circuit diagram of one pixel PX among the plurality of pixels is illustrated as an example. FIG. 3B illustrates, as an example, a pixel PX connected to a i-th scan line GLi and a i-th light emitting control line ECLi.

The pixel PX may include a light emitting element EE and a pixel circuit CC. The pixel circuit CC may include a plurality of transistors T1 to T7 and a capacitor CP. The plurality of transistors T1 to T7 may be formed through a low temperature polycrystalline silicon ("LTPS") process or a low temperature polycrystalline oxide ("LTPO") process.

The pixel circuit CC controls the amount of current flowing through the light emitting element EE in response to data signals. The light emitting element EE may emit light with a predetermined luminance in response to the amount of current provided from the pixel circuit CC. To this end, the level of a first power ELVDD may be set higher than the level of a second power ELVSS. The light emitting element EE may include an organic light emitting element or a quantum dot light emitting element.

The plurality of transistors T1 to T7 each may include an input electrode (or a source electrode), an output electrode (or a drain electrode), and a control electrode (or a gate electrode). In the present description, for convenience, any one of the input electrode or the output electrode may be referred to as a first electrode, and the other may be referred to as a second electrode.

The first electrode of the first transistor T1 is connected to the first power ELVDD via the fifth transistor T5, and the second electrode of the first transistor T1 is connected to an anode electrode of the light emitting element EE via the sixth transistor T6. The first transistor T1 may be referred to as a driving transistor in the present description.

The first transistor T1 controls the amount of current flowing through the light emitting element EE in response to a voltage applied to the control electrode of the first transistor T1.

The second transistor T2 is connected between the data line DL and the first electrode of the first transistor T1. In addition, the control electrode of the second transistor T2 is connected to the i-th scan line GLi. The second transistor T2 is turned on when an i-th scan signal is provided to the i-th scan line GLi to electrically connect the data line DL with the first electrode of the first transistor T1.

The third transistor T3 is connected between the second electrode of the first transistor T1 and the control electrode of the first transistor T1. The control electrode of the third transistor T3 is connected to the i-th scan line GLi. The third transistor T3 is turned on when an i-th scan signal is provided to the i-th scan line GLi to electrically connect the second electrode of the first transistor T1 with the control electrode of the first transistor T1. Accordingly, when the third transistor T3 is turned on, the first transistor T1 is connected in the form of a diode.

The fourth transistor T4 is connected between a node ND and an initialization power generation unit (not shown). In addition, the control electrode of the fourth transistor T4 is connected to an i−1th scan line GLi−1. The fourth transistor T4 is turned on when an i−1th scan signal is provided to the i−1th scan line GLi−1 to provide an initialization voltage Vint to the node ND.

The fifth transistor T5 is connected between the power line PL and the first electrode of the first transistor T1. The control electrode of the fifth transistor T5 is connected to the i-th light emitting control line ECLi.

The sixth transistor T6 is connected between the second electrode of the first transistor T1 and the anode electrode of the light emitting element EE. In addition, the control electrode of the sixth transistor T6 is connected to the i-th light emitting control line ECLi.

The seventh transistor T7 is connected between the initialization power generation unit (not shown) and the anode electrode of the light emitting element EE. In addition, the control electrode of the seventh transistor T7 is connected to an i+1th scan line GLi+1. Such a seventh transistor T7 is turned on when an i+1th scan signal is provided to the i+1th scan line GLi+1 to provide the initialization voltage Vint to the anode electrode of the light emitting element EE.

The seventh transistor T7 may improve black-displaying capability of the pixel PX. To be specific, when the seventh transistor T7 is turned on, a parasitic capacitor (not shown) of the light emitting element EE is discharged. Then, when black luminance is implemented, the light emitting element EE does not emit light due to a leakage current from the first transistor T1, and accordingly, the black-displaying capability may be improved.

Additionally, FIG. 3B illustrates that the control electrode of the seventh transistor T7 is connected to the i+1th scan line GLi+1, but the embodiment of the inventive concept is not limited thereto. In another embodiment of the inventive concept, the control electrode of the seventh transistor T7 may be connected to the i-th scan line GLi or the i−1th scan line GLi−1.

The capacitor CP is disposed between the power line PL and the node ND. The capacitor CP stores a voltage corresponding to a data signal. When the fifth transistor T5 and the sixth transistor T6 are turned on according to the voltage stored in the capacitor CP, the amount of current flowing through the first transistor T1 may be determined.

In the inventive concept, an equivalent circuit of the pixel PX is not limited to the equivalent circuit shown in FIG. 3B. In another embodiment of the inventive concept, the pixel PX may be implemented in various forms to emit light of the light emitting element EE. FIG. 3B is illustrated on the basis of a p-channel MOSFET ("PMOS"), but the embodiment of the inventive concept is not limited thereto. In another embodiment of the inventive concept, the pixel circuit CC may be formed on the basis of a n-channel MOSFET ("NMOS"). In another embodiment of the inventive concept, the pixel circuit CC may be configured through a combination of NMOS and PMOS.

Referring back to FIG. 3A, a power pattern VDD is disposed in the non-display area NDA. In the present embodiment, the power pattern VDD is connected to a plurality of power lines PL. Accordingly, the display panel DP includes the power pattern VDD, and may thus provide identical first power signals to the plurality of pixels PX.

The display pads PDD may include a first pad D1 and a second pad D2. The first pad D1 may be provided in plurality and may each be connected to the data lines DL. The second pad D2 may be connected to the power pattern VDD to be electrically connected to the power line PL. The display panel DP may provide electrical signals provided from the outside through the display pads PDD to the pixels PX. The display pads PDD may further include pads for receiving other electrical signals in addition to the first pad D1 and the second pad D2, and the embodiment of the inventive concept is not limited to any one embodiment.

Referring to FIG. 4, the input sensing panel ISL may be disposed on the display panel DP. The input sensing panel ISL may be bonded to the display panel DP through a separate adhesive layer. However, the embodiment of the inventive concept is not limited thereto, and the input sensing panel ISL may be directly formed on the display panel DP through a continuous manufacturing process in another embodiment, and the invention is not limited to any one embodiment.

The input sensing panel ISL may include a first sensing electrode TE1, a second sensing electrode TE2, a plurality of trace lines TL1, TL2, and TL3, and a plurality of sensing pads TP1, TP2, and TP3. In the input sensing panel ISL, a sensing area SA and a non-sensing area NSA may be defined. The non-sensing area NSA may surround the sensing area SA. The sensing area SA may be a sensing area detecting inputs applied from the outside. The sensing area SA may overlap the display area DA of the display panel DP.

The input sensing panel ISL may detect external inputs through any one of a self-capacitance type or a mutual capacitance type. The first sensing electrode TE1 and the second sensing electrode TE2 may be variously deformed according to the types to be arranged and connected.

The first sensing electrode TE1 may include first sensing patterns SP1 and first bridge patterns BP1. The first sensing electrode TE1 may extend along the first direction DR1 and be arranged along the second direction DR2. The first sensing patterns SP1 may be arranged to be spaced apart along the first direction DR1. At least one first bridge pattern BP1 may be disposed between two first sensing patterns SP1 adjacent to each other.

The second sensing electrode TE2 may include second sensing patterns SP2 and second bridge patterns BP2. The second sensing electrode TE2 may extend along the second direction DR2 and be arranged along the first direction DR1. The second sensing patterns SP2 may be arranged to be spaced apart along the second direction DR2. At least one second bridge pattern BP2 may be disposed between two second sensing patterns SP2 adjacent to each other.

The trace lines TL1, TL2, and TL3 are disposed in the non-sensing area NSA. The trace lines TL1, TL2, and TL3 may include a first trace line TL1, a second trace line TL2, and a third trace line TL3.

The first trace line TL1 is connected to one end of the first sensing electrode TE1 The second trace line TL2 is connected to one end of the second sensing electrode TE2. The third trace line TL3 is connected to the other end of the second sensing electrode TE2, respectively. The other end of the second sensing electrode TE2 may be a portion facing the one end of the second sensing electrode TE2.

According to the inventive concept, the second sensing electrode TE2 may be connected to the second trace line TL2 and the third trace line TL3. Accordingly, sensitivity according to a region may be uniformly maintained for the second sensing electrode TE2 having a relatively longer length than the first sensing electrodes TE1 However, this is illustrated as an example, and the third trace line TL3 may be omitted, and the third trace line TL3 according to the invention is not limited to any one embodiment.

The sensing pads PDT (i.e., TP1, TP2, and TP3) are disposed in the non-sensing area NSA. The sensing pads TP1, TP2, and TP3 may include a first sensing pad TP1, a second sensing pad TP2, and a third sensing pad TP3. The first sensing pad TP1 is connected to the first trace line TL1 to be electrically connected to the first sensing electrode TE1 The second sensing pad TP2 is connected to the second trace line TL2, and the third sensing pad TP3 is connected to the third trace line TL3. Accordingly, the second sensing pad TP2 and the third sensing pad TP3 are electrically connected to the corresponding second sensing electrode TE2.

Figure 5:
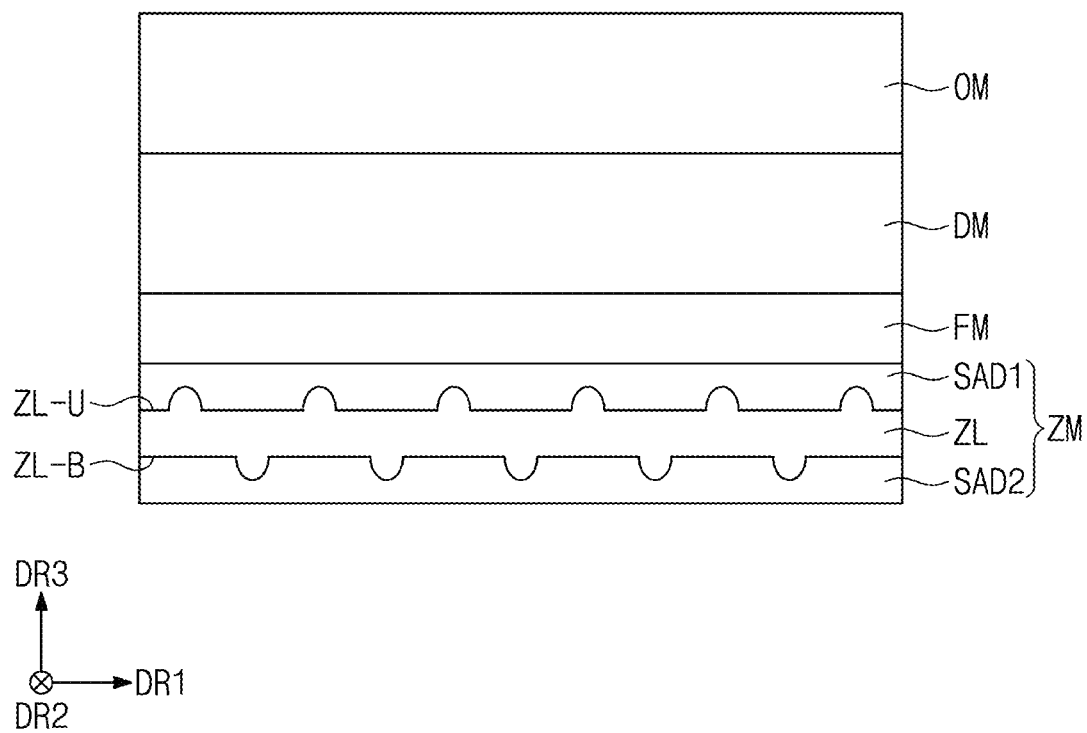
FIG. 5 is a cross-sectional view of a portion of an electronic apparatus according to an embodiment of the inventive concept.
Figure 6:
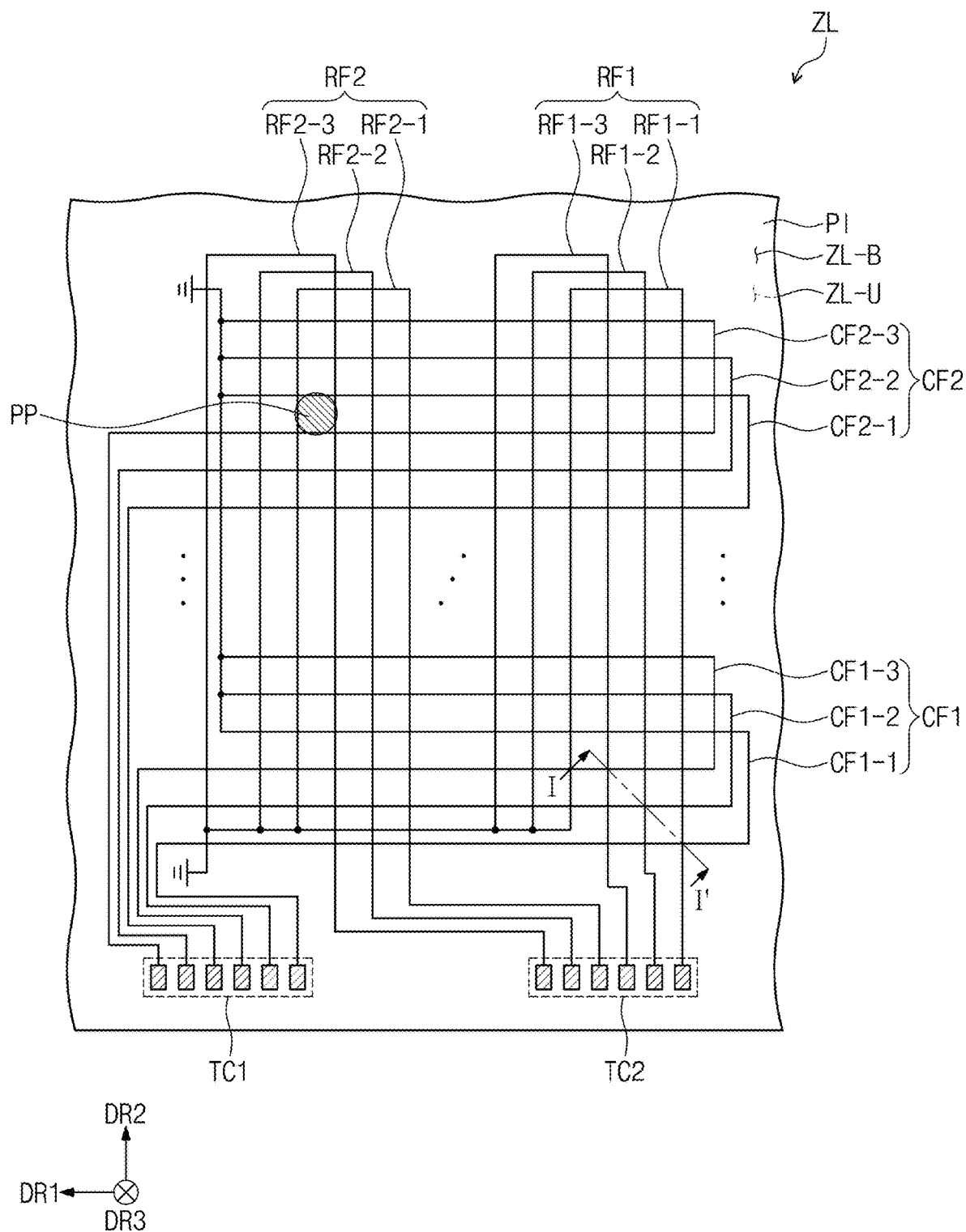
FIG. 6 is a plan view of a digitizer according to an embodiment of the inventive concept.
Figure 7A:
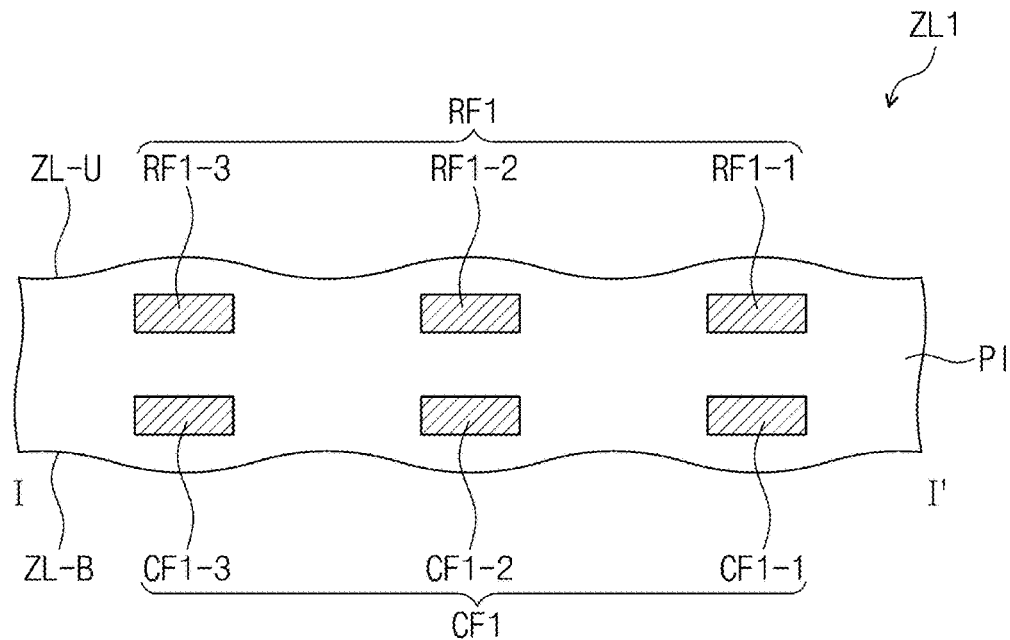
FIGS. 7A and 7B are cross-sectional views of a digitizer according to embodiments of the inventive concept.
Figure 7B:
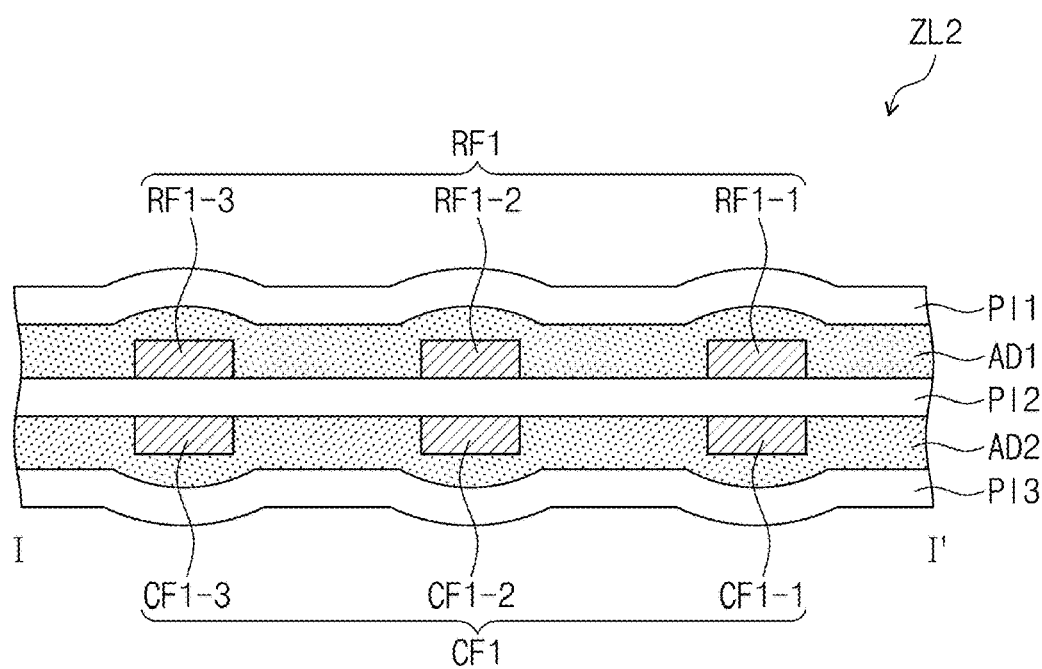

FIG. 5 is a cross-sectional view of a portion of an electronic apparatus according to an embodiment of the inventive concept. FIG. 6 is a plan view of a digitizer ZL according to an embodiment of the inventive concept. FIGS. 7A and 7B are cross-sectional views of digitizers according to embodiments of the inventive concept. FIGS. 7A and 7B are cross-sectional views taken along line I-I' of FIG. 6. The same reference numerals are given for the same configurations as in FIGS. 1A to 4, and redundant descriptions are omitted.

The detection sensor unit ZM according to the inventive concept includes a digitizer ZL, a first adhesive layer SAD1, and a second adhesive layer SAD2. The digitizer ZL according to an embodiment includes a first surface ZL-U (i.e., a front/upper surface) and a second surface ZL-B (i.e., a rear/lower surface) facing the first surface ZL-U. The first surface ZL-U may be disposed relatively closer to the display module DM than the second surface ZL-B.

The digitizer ZL according to the inventive concept may detect external inputs through an electromagnetic resonance ("EMR") method. The electromagnetic resonance (EMR) method generates a vibrating magnetic field in a resonance circuit configured inside the pen SP (FIG. 1), and the vibrating magnetic field induces signals to a plurality of coils included in the digitizer ZL, and detects the position of the pen SP (FIG. 1) through the signals induced to the coils.

In an embodiment, the first adhesive layer SAD1 is disposed on the first surface ZL-U, and a second adhesive layer SAD2 is disposed below the second surface ZL-B. The digitizer ZL may adhere to other components of the electronic apparatus EA through the first adhesive layer SAD1 and the second adhesive layer SAD2 disposed on the first surface ZL-U and the second surface ZL-B, respectively.

The first adhesive layer SAD1 may have a greater surface roughness at a second surface contacting the first surface ZL-U than a first surface opposite the second surface. For example, the first surface may contact the lower film FM in FIG. 5. The second adhesive layer SAD2 may have a greater surface roughness at a second surface contacting the second surface ZL-B than a first surface opposite the second surface.

The first adhesive layer SAD1 and the second adhesive layer SAD2 may be two-time-cured adhesive layers. In the inventive concept, the two-time-cured adhesive layer refers to an adhesive layer having adhesion and reliability by being fully cured through two times of curing. For example, about 50% of the adhesive layer is cured through primary curing, and the remaining 50% of the adhesive layer is cured through secondary curing. The first adhesive layer SAD1 and the second adhesive layer SAD2 may be layers formed through the two-time curing of the same adhesive composition.

The first adhesive layer SAD1 and the second adhesive layer SAD2 according to an embodiment contain a resin composition, and an adhesive composition including a curing agent. The first adhesive layer SAD1 and the second adhesive layer SAD2 may be layers formed through, more specifically, curing of the adhesive composition.

The resin composition according to an embodiment includes (meth)acrylate and a secondary initiator. In the present description, the (meth)acrylate refers to acrylate or methacrylate. The type of (meth)acrylate included in the resin composition of an embodiment is not particularly limited, and may be, for example, methyl acrylate, ethyl acrylate, propyl acrylate and butyl acrylate, 2-ethylhexyl acrylate, 2-ethylpentyl acrylate, 2-ethylheptyl acrylate, 2-ethylnonyl acrylate, 2-propylhexyl acrylate, 2-propyloctyl, etc.

The secondary initiator included in the resin composition of an embodiment may be an initiator that is not decomposed in the primary curing but decomposed in the secondary curing. The type of the secondary initiator according to the invention is not particularly limited as long as the secondary initiator is a material that is not decomposed in the primary curing, and may be, for example, a photoinitiator initiating photopolymerization of photocurable materials. The photoinitiator may be, for example, at least one among benzophenone, bis-acylphosphine oxide, phenylphosphine oxide, monoacrylphosphine, alpha-hydroxyketone, alpha-aminoketone, (o-ethoxycarboxyl)oxime, acetophenone, phenyl glyoxylic, benzyldimethyl-ketal, Michler's ketone, imidazole, methylidinetrisdimethylaniline, idonium, sulfonium thymonate, sulfonium phosphonate, metallocene, oligomeric alpha-hydroketone, thioxanthone, benzoyl-sulfide, aminobenzoate, and hydroxycyclo hexylphenylketone.

The first adhesive layer SAD1 and the second adhesive layer SAD2 may further contain an additive. Examples of the additive may include photosensitizers, polymerization inhibitors, leveling agents, surfactants, adhesion-imparting agents, plasticizers, ultraviolet ray absorbers, antioxidants, storage stabilizers, antistatic agents, inorganic fillers, pigments, dyes, etc., but examples of the additive according to the invention are not limited to thereto.

The first adhesive layer SAD1 and the second adhesive layer SAD2 each may have a thickness of about 10 μm to about 50 μm in the third direction DR3 (i.e., thickness direction). If the thicknesses of the first adhesive layer SAD1 and the second adhesive layer SAD2 are less than about 10 μm, adhesion may be deteriorated. In addition, if the thicknesses of the first adhesive layer SAD1 and the second adhesive layer SAD2 are greater than about 50 μm, the total thickness of the electronic apparatus EA may be too thick, and may thus folding reliability may be degraded.

The first adhesive layer SAD1 and the second adhesive layer SAD2 each may have a storage modulus of about 0.01 megapascals (MPa) to about 5 MPa at −20 degrees in Celsius (° C.). When the first adhesive layer SAD1 and the second adhesive layer SAD2 each have a storage modulus within the above range, the folding reliability of the electronic apparatus EA may be secured.

Referring to FIG. 6, the digitizer ZL may include a base layer PI, digitizer sensors CF1, CF2, RF1, and RF2, and a plurality of digitizer pads TC1 and TC2.

The base layer PI may be a base layer having the digitizer sensors CF1, CF2, RF1, and RF2 disposed thereon. The base layer PI may include an organic material. For example, the base layer PI may include polyimide (PI).

The first digitizer sensors RF1 and RF2 each include a plurality of first sensing coils RF1-1, RF1-2, RF1-3, RF2-1, RF2-2, and RF2-3, and the second digitizer sensors CF1 and CF2 each include a plurality of second sensing coils CF1-1, CF1-2, CF1-3, CF2-1, CF2-2, and CF2-3. The plurality of first sensing coils RF1-1, RF1-2, RF1-3, RF2-1, RF2-2, and RF2-3 and the plurality of second sensing coils CF1-1, CF1-2, CF1-3, CF2-1, CF2-2, and CF2-3 each may include a metal. In an embodiment, the plurality of first sensing coils RF1-1, RF1-2, RF1-3, RF2-1, RF2-2, and RF2-3, and the plurality of second sensing coils CF1-1, CF1-2, CF1-3, CF2-1, CF2-2, and CF2-3 each may include copper (Cu).

The first sensing coils RF1-1, RF1-2, RF1-3, RF2-1, RF2-2, and RF2-3 may extend in the second direction DR2. The first sensing coils RF1-1, RF1-2, RF1-3, RF2-1, RF2-2, and RF2-3 may be arranged to be spaced apart from one another along the first direction DR1.

The second sensing coils CF1-1, CF1-2, CF1-3, CF2-1, CF2-2, and CF2-3 may extend in the first direction DR1. The second sensing coils CF1-1, CF1-2, CF1-3, CF2-1, CF2-2, and CF2-3 may be arranged to be spaced apart from one another along the second direction DR2.

The first digitizer sensors RF1 and RF2 correspond to input coils of the digitizer ZL (e.g., electromagnetic resonance type digitizer), and the second digitizer sensors CF1 and CF2 correspond to output coils of the electromagnetic resonance type digitizer.

The first sensing coils RF1-1, RF1-2, RF1-3, RF2-1, RF2-2, and RF2-3 and the second sensing coils CF1-1, CF1-2, CF1-3, CF2-1, CF2-2, and CF2-3 may be disposed to be insulated from one another in the base layer PI. The first sensing coils RF1-1, RF1-2, RF1-3, RF2-1, RF2-2, and RF2-3 each are connected to the corresponding first digitizer pads TC1, and the second sensing coils CF1-1, CF1-2, CF1-3, CF2-1, CF2-2, and CF2-3 each are connected to the corresponding second digitizer pads TC2.

The first sensing coils RF1-1, RF1-2, RF1-3, RF2-1, RF2-2, and RF2-3 each receive scan signals activated in different sections. The first sensing coils RF1-1, RF1-2, RF1-3, RF2-1, RF2-2, and RF2-3 each generate a magnetic field in response to the corresponding scan signals.

When the pen SP (see FIG. 1A) is adjacent to the first sensing coils RF1-1, RF1-2, RF1-3, RF2-1, RF2-2, and RF2-3, the magnetic field induced from the first sensing coils RF1-1, RF1-2, RF1-3, RF2-1, RF2-2, and RF2-3 resonates with the resonance circuit of the pen SP. The pen SP generates resonant frequencies. In this case, the pen SP may be a pen SP having an LC resonance circuit including an inductor and a capacitor.

The second sensing coils CF1-1, CF1-2, CF1-3, CF2-1, CF2-2, and CF2-3 output sensing signals according to the resonant frequencies of an input means to the second digitizer pads TC2.

The center of the area where the second coil RF2-2 among the first sensing coils RF1-1, RF1-2, RF1-3, RF2-1, RF2-2, and RF2-3 and the second coil CF2-2 among the second sensing coils CF1-1, CF1-2, CF1-3, CF2-1, CF2-2, and CF2-3 cross is assumed as an input point PP.

The sensing signal output from the second coil RF2-2 among the first sensing coils RF1-1, RF1-2, RF1-3, RF2-1, RF2-2, and RF2-3 has a higher level than the sensing signals output from the remaining first sensing coils RF1-1, RF1-2, RF1-3, RF2-1, and RF2-3.

The sensing signal output from the second coil CF2-2 among the second sensing coils CF1-1, CF1-2, CF1-3, CF2-1, CF2-2, and CF2-3 has a higher level than the sensing signals output from the remaining second sensing coils CF1-1, CF1-2, CF1-3, CF2-1, and CF2-3.

The sensing signals output from the first coil CF2-1 and the third coil CF2-3 among the second sensing coils CF1-1, CF1-2, CF1-3, CF2-1, CF2-2, and CF2-3 have a lower level than the sensing signal output from the second coil CF2-2, and the sensing signals output from the first coil CF2-1 and the third coil CF2-3 among the second sensing coils CF1-1, CF1-2, CF1-3, CF2-1, CF2-2, and CF2-3 have a higher level than the sensing signals output from the remaining second sensing coils CF1-1, CF1-2, and CF1-3.

Based on the time when the sensing signal output from the second coil CF2-2 having a high level is detected and the relative position of the second coil CF2-2 with respect to the second sensing coils CF1-1, CF1-2, CF1-3, CF2-1, and CF2-3, two-dimensional coordinate information of the input point PP through the pen SP may be calculated.

FIGS. 7A and 7B illustrate a structure of digitizers ZL1 and ZL2 of an embodiment, but the structure of the digitizers ZL1 and ZL2 according to the invention is not limited thereto, and the digitizers may have various structures.

Referring to FIG. 7A, in an embodiment, the digitizer ZL2 may include a base layer PI and a plurality of digitizer sensors RF1, RF2, CF1, and CF2 disposed inside the base layer PI. In the inventive concept, the term "disposed inside" may be referred to as "embedded". Accordingly, the digitizer sensors RF1, RF2, CF1, and CF2 may be embedded in the base layer PI.

Referring to FIG. 7B, in another embodiment, the digitizer ZL2 may include a first base layer PI1, a first sensing coil RF1, a first adhesive layer AD1, and a second base layer PI2, which are sequentially stacked. In addition, the second sensing coil CF1, the second adhesive layer AD2, and the third base layer PI3 may be further sequentially stacked on the second base layer PI2.

Figure 8A:
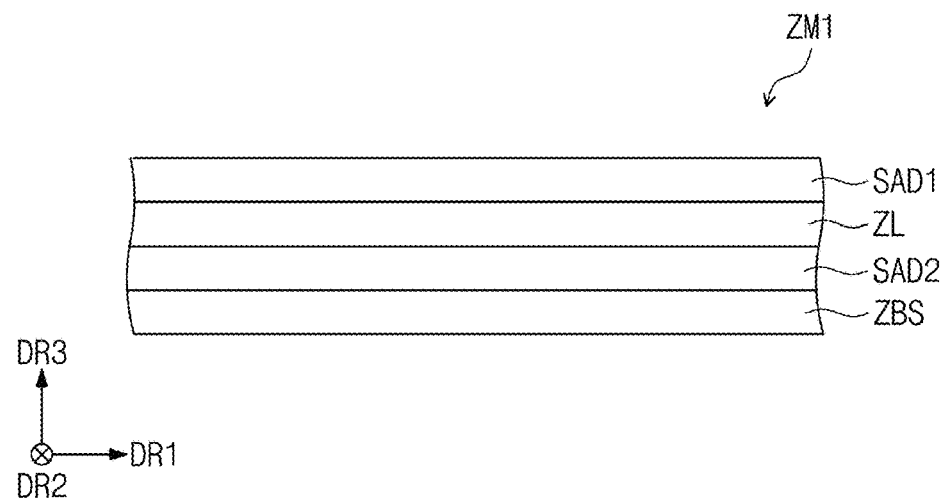
FIGS. 8A to 8C are cross-sectional views of a portion of a detection sensor unit according to an embodiment of the inventive concept.
Figure 8B:
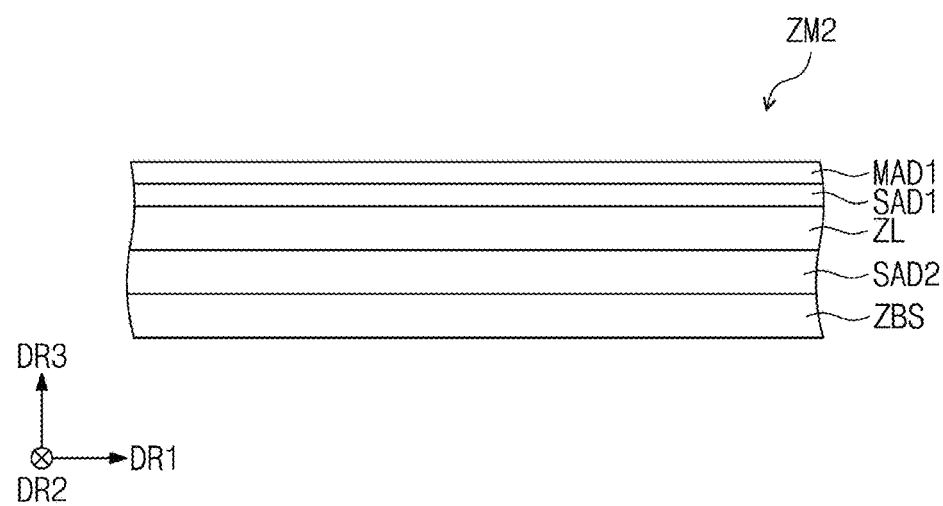
Figure 8C:
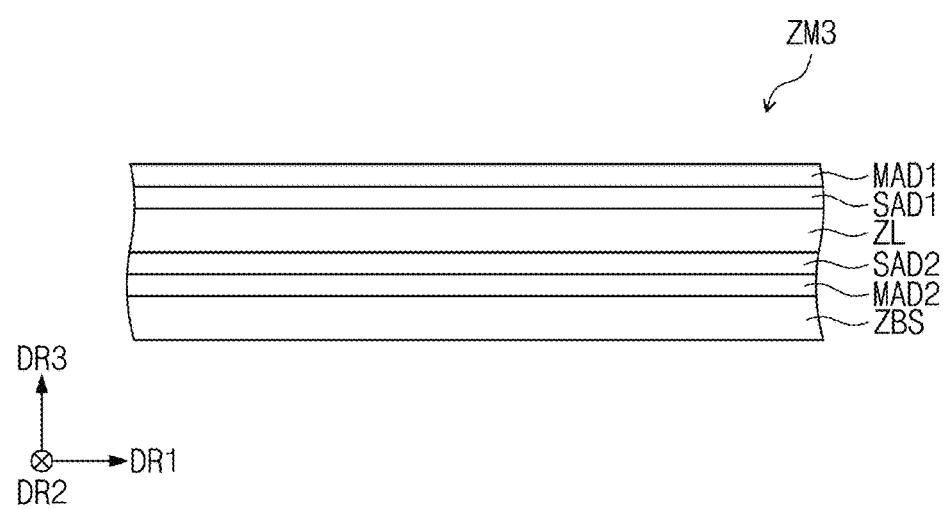

FIGS. 8A to 8C schematically illustrate a cross section of a detection sensor unit. The same reference numerals are given for the same configurations as in FIGS. 1A to 7B, and redundant descriptions are omitted.

Referring to FIGS. 8A to 8C, the detection sensor unit according to an embodiment may further include any one among a shielding layer ZBS, a first sub-adhesive layer MAD1, and a second sub-adhesive layer MAD2. However, the embodiment of the inventive concept is not limited thereto, and any one among the shielding layer ZBS, the first sub-adhesive layer MAD1, and the second sub-adhesive layer MAD2 may be omitted or further included in other embodiments.

Referring to FIG. 8A, the detection sensor unit ZM1 according to the present embodiment may further include a shielding layer ZBS. The shielding layer ZBS may be disposed below the second adhesive layer SAD2. The shielding layer ZBS may be a part of a base layer used as a base substrate during a process of forming the detection sensor unit ZM1. The shielding layer ZBS may prevent electrical interference between the digitizer ZL and other components. Accordingly, an electronic apparatus having improved reliability may be provided.

In the present embodiment, the shielding layer ZBS may include a metal. For example, the shielding layer ZBS may include any one of permalloy or invar, which is an alloy of nickel (Ni) and iron (Fe), or stainless steel.

Referring to FIGS. 8B and 8C, the detection sensor units ZM2 and ZM3 according to the present embodiment may further include a first sub-adhesive layer MAD1. The first sub-adhesive layer MAD1 may be an adhesive layer for modulus control. The first sub-adhesive layer MAD1 may be disposed on the first adhesive layer SAD1 to have a lower storage modulus than the first adhesive layer SAD1. To be specific, the first sub-adhesive layer MAD1 may have a storage modulus of about 0.01 MPa to about 1 MPa at −20° C.

When the detection sensor units ZM2 and ZM3 further include the first sub-adhesive layer MAD1, the sum of the thicknesses of the first sub-adhesive layer MAD1 and the first adhesive layer SAD1 may be about 10 µm to about 50 µm.

Referring to FIG. 8C, in addition, the detection sensor unit ZM3 according to the present embodiment may further include a second sub-adhesive layer MAD2. The second sub-adhesive layer MAD2 may be an adhesive layer for modulus control. The second sub-adhesive layer MAD2 may be disposed below the second adhesive layer SAD2 to have a lower storage modulus than the second adhesive layer SAD2. To be specific, the second sub-adhesive layer MAD2 may have a storage modulus of about 0.01 MPa to about 1 MPa at −20° C.

When the detection sensor units ZM2 and ZM3 further include the second sub-adhesive layer MAD2, the sum of the thicknesses of the second sub-adhesive layer MAD2 and the second adhesive layer SAD2 may be about 10 µm to about 50 µm.

FIGS. 9A to 9E are cross-sectional views schematically illustrating a method for manufacturing an electronic apparatus according to an embodiment of the inventive concept. The same/like reference numerals are given for the same/like configurations as in FIGS. 1A to 8C, and redundant descriptions are omitted. Hereinafter, a method for manufacturing an electronic apparatus according to an embodiment of the inventive concept will be described with reference to FIGS. 9A to 9E.

A method for manufacturing an electronic apparatus according to an embodiment of the inventive concept includes disposing a display panel below a window and disposing a detection sensor unit below the display panel.

Figure 9A:
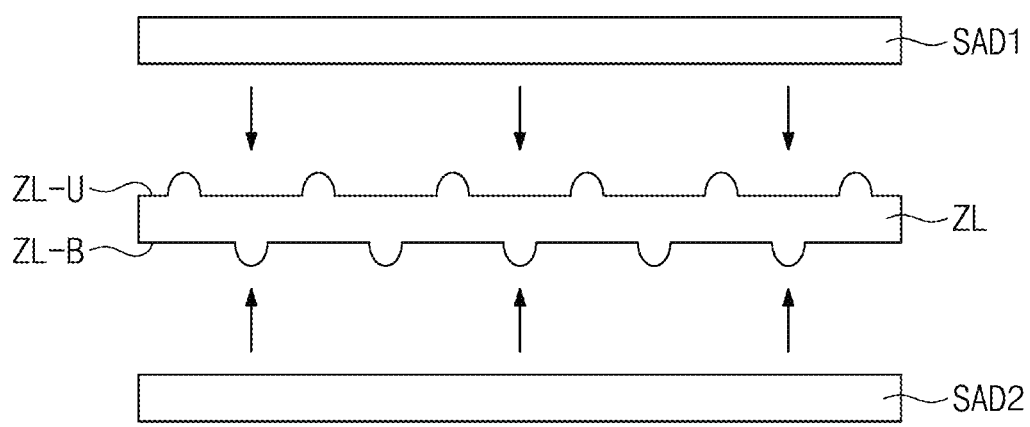
FIGS. 9A to 9E are cross-sectional views sequentially illustrating a method for manufacturing a detection sensor unit according to an embodiment of the inventive concept.

Referring to FIG. 9A, in the disposing of the detection sensor unit, stacking a digitizer ZL between a first adhesive layer SAD1 in a semi-cured state and a second adhesive layer SAD2 in a semi-cured state is performed. The stacking order of the first adhesive layer SAD1 and the second adhesive layer SAD2 on the digitizer ZL is not limited, and for example, through a lamination method using a roller, the first adhesive layer SAD1, the digitizer ZL, and the second adhesive layer SAD2 may be sequentially stacked. The first adhesive layer SAD1 in the semi-cured state and the second adhesive layer SAD2 in the semi-cured state are cured by about 50%, and may be in a state of having a fine adhesive strength, and then irradiated with light such as ultraviolet rays to be fully cured.

Figure 9B:
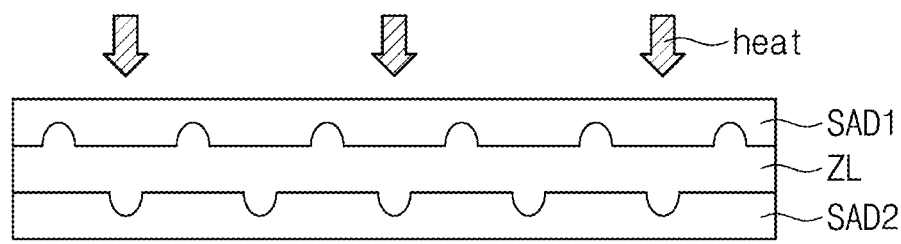

Referring to FIG. 9B, in the disposing of the detection sensor unit, increasing the flatness of the first adhesive layer SAD1 and the second adhesive layer SAD2 may be performed. The increasing of the flatness of the first adhesive layer SAD1 and the second adhesive layer SAD2 may be performed by providing heat to a laminate in which the first adhesive layer SAD1, the digitizer ZL, and the second adhesive layer SAD2 are stacked. To be specific, heat of about 60° C. to about 150° C. may be applied. Here, the target surface to make flat is a first surface of each of the first adhesive layer SAD1 and the second adhesive layer SAD2, where a second surface of each of the first adhesive layer SAD1 and the second adhesive layer SAD2 faces/attaches to the digitizer ZL, and the first surface is opposite to the second surface.

The first adhesive layer SAD1 and the second adhesive layer SAD2 may each have a step difference on a first surface opposite a second surface contacting the digitizer ZL due to a plurality of sensing coils of the digitizer ZL. In this case, when heat is provided to the first adhesive layer SAD1 and the second adhesive layer SAD2, hot-melt may be caused in the first adhesive layer SAD1 and the second adhesive layer SAD2, and accordingly, the step difference generated on the first surfaces of the first adhesive layer SAD1 and the second adhesive layer SAD2 is removed or reduced, and the first surfaces of the first adhesive layer SAD1 and the second adhesive layer SAD2 become flat.

Figure 9C:
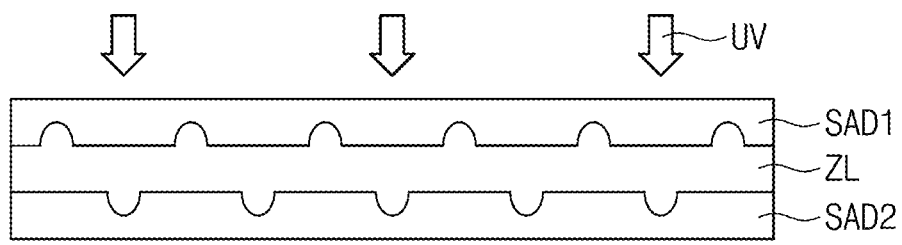

Referring to FIG. 9C, in the disposing of the detection sensor unit, providing light ("UV") to the laminate in which the first adhesive layer SAD1, the digitizer ZL, and the second adhesive layer SAD2 are stacked is performed. To be specific, light energy of about 500 millijoules (mJ) to about 5000 mJ may be provided. The first adhesive layer SAD1 and the second adhesive layer SAD2 include a secondary initiator, and the secondary initiator absorbs the provided light (UV) to get the secondary curing performed, and accordingly, the first adhesive layer SAD1 and the second adhesive layer SAD2 may be fully cured.

Figure 9D:
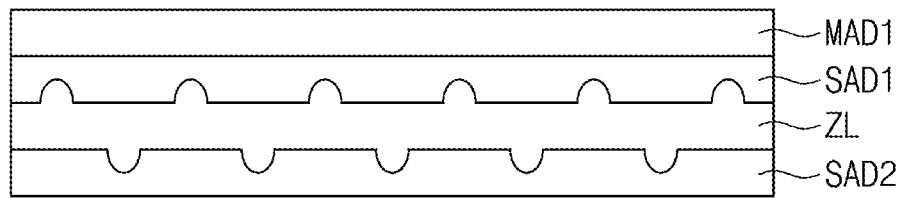

Referring to FIG. 9D, in the disposing of the detection sensor unit, forming a first sub-adhesive layer MAD1 on the first adhesive layer SAD1 may be further performed.

Figure 9E:
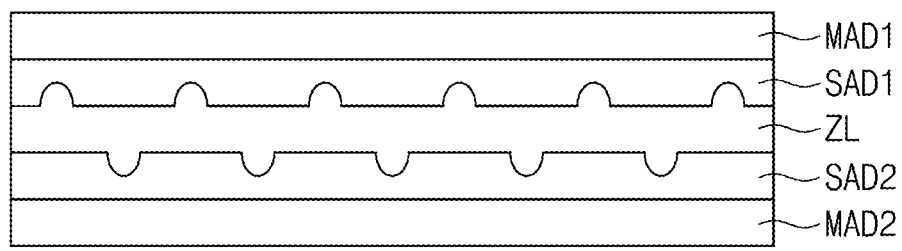

Referring to FIG. 9E, in the disposing of the detection sensor unit, forming a second sub-adhesive layer MAD2 below the second adhesive layer SAD2 may be further performed.

Hereinafter, the inventive concept will be described in more detail through characteristic values when the specific digitizers of Examples and Comparative Examples are applied to electronic apparatuses. Examples below are merely an example to aid understanding of the inventive concept, and the scope of the inventive concept is not limited thereto.

[Comparison of Electronic Apparatus Characteristics]

In Table 1 below, surface folding and viewability properties are measured and shown when detection sensor units of Examples and Comparative Examples are applied to electronic apparatuses. The electronic apparatuses of Examples are manufactured through a manufacturing method according to an embodiment of the inventive concept, and a first adhesive layer and a second adhesive layer are two-time-cured adhesive layers that are fully cured through a flattening process after semi-curing. In the electronic apparatuses of Examples 1, 4, and 5, a detection sensor unit including the first adhesive layer and the second adhesive layer was applied as shown in FIG. 8A. The electronic apparatus of Example 2 further includes a first sub-adhesive layer as shown in FIG. 8B, and the electronic apparatus of Example 3 further includes a first sub-adhesive layer and a second sub-adhesive layer as shown in FIG. 8C. In the electronic apparatus of Comparative Example 1, an electronic apparatus was manufactured in the same way as in the electronic apparatus of Example 1, except that the first adhesive layer and the second adhesive layer are not two-time-cured, but a general adhesive layer which is fully cured through a single curing process.

TABLE 1

|  | Example 1 | Example 2 | Example 3 | Example 4 | Example 5 | Comparative Example 1 |
|---|---|---|---|---|---|---|
| Type of first adhesive layer | Two-time-cured | Two-time-cured | Two-time-cured | Two-time-cured | Two-time-cured | general |
| Thickness of first adhesive layer | 25 μm | 10 μm | 10 μm | 25 μm | 50 μm | 25 μm |
| Storage modulus of first adhesive layer | 2 MPa | 2 MPa | 2 MPa | 3 MPa | 2 MPa | 2 MPa |
| Type of first sub-adhesive layer | — | General | General | — | — | — |

TABLE 1-continued

|  | Example 1 | Example 2 | Example 3 | Example 4 | Example 5 | Comparative Example 1 |
|---|---|---|---|---|---|---|
| Thickness of first sub-adhesive layer | — | 15 μm | 15 μm | — | — | — |
| Storage modulus of first sub-adhesive layer | — | 0.1 MPa | 0.1 MPa | — | — | — |
| Type of second adhesive layer | Two-time-cured | Two-time-cured | Two-time-cured | Two-time-cured | Two-time-cured | General |
| Thickness of second adhesive layer | 25 μm | 25 μm | 25 μm | 25 μm | 50 μm | 25 μm |
| Storage modulus of second adhesive layer | 2 MPa | 2 MPa | 2 MPa | 3 MPa | 2 MPa | 2 MPa |
| Type of second sub-adhesive layer | — | — | General | — | — | — |
| Thickness of second sub-adhesive layer | — | — | 15 μm | — | — | — |
| Storage modulus of second sub-adhesive layer | — | — | 0.1 MPa | — | — | — |
| Folding property | OK after folding greater than 200K | OK after folding greater than 400K | OK after folding greater than 500K | OK after folding greater than 100K | OK after folding greater than 80K | OK after folding greater than 200K |
| Viewability property | No wiring viewed | No wiring viewed | No wiring viewed | No wiring viewed | No wiring viewed | Wiring viewed |

Here, for example, 200K means 200,000.

Referring to the results of Table 1, the electronic apparatuses according to an embodiment dispose the first adhesive layer and the second adhesive layer which are two-time-cured above and below the digitizer, and may thus provide electronic apparatuses having improved folding and viewability properties. Furthermore, the first sub-adhesive layer and/or the second sub-adhesive layer having a controlled storage modulus are disposed on the first adhesive layer and second adhesive layer, and thus an electronic apparatus having further improved folding properties may be provided.

According to an embodiment of the inventive concept, a digitizer may be applied to an electronic apparatus to be folded, thereby enabling input detection through a pen, etc., and enhancing the folding reliability of the electronic apparatus.

Although the inventive concept has been described with reference to a preferred embodiment of the inventive concept, it will be understood that the inventive concept should not be limited to these preferred embodiments but various changes and modifications can be made by those skilled in the art without departing from the spirit and scope of the inventive concept.

Accordingly, the technical scope of the inventive concept is not intended to be limited to the contents set forth in the detailed description of the specification, but is intended to be defined by the appended claims.

What is claimed is:

1. An electronic apparatus comprising:
   a window;
   a display panel disposed below the window;
   a digitizer disposed below the display panel and including a first surface and a second surface opposing the first surface;
   a first adhesive layer disposed on the first surface; and
   a second adhesive layer disposed below the second surface,
   wherein a third surface of each of the first adhesive layer and the second adhesive layer is flatter than a fourth surface of each of the first adhesive layer and the second adhesive layer, the fourth surface faces the digitizer, and the third surface is opposite to the fourth surface.

2. The electronic apparatus of claim 1, wherein the first adhesive layer and the second adhesive layer each have a storage modulus of about 0.01 megapascals (MPa) to about 5 MPa at −20 degrees in Celsius (° C.).

3. The electronic apparatus of claim 1, wherein the first adhesive layer and the second adhesive layer each have a thickness of about 10 micrometers (μm) to about 50 μm in a thickness direction.

4. The electronic apparatus of claim 1, further comprising a first sub-adhesive layer disposed on the first adhesive layer,
wherein the first sub-adhesive layer has a lower storage modulus than the first adhesive layer.

5. The electronic apparatus of claim 4, wherein the first sub-adhesive layer has a storage modulus of about 0.01 MPa to about 1 MPa at −20° C.

6. The electronic apparatus of claim 4, wherein a sum of the thicknesses of the first sub-adhesive layer and the first adhesive layer is about 10 μm to about 50 μm in a thickness direction.

7. The electronic apparatus of claim 1, further comprising a second sub-adhesive layer disposed below the second adhesive layer,
wherein the second sub-adhesive layer has a lower storage modulus than the second adhesive layer.

8. The electronic apparatus of claim 7, wherein the second sub-adhesive layer has a storage modulus of about 0.01 MPa to about 1 MPa at −20° C.

9. The electronic apparatus of claim 7, wherein a sum of the thicknesses of the second sub-adhesive layer and the second adhesive layer is about 10 μm to about 50 μm in a thickness direction.

10. The electronic apparatus of claim 1, wherein the digitizer comprises a plurality of first sensing coils and a plurality of second sensing coils.

11. The electronic apparatus of claim 1, further comprising a shielding layer disposed below the second adhesive layer,
wherein the shielding layer includes magnetic metal powder.

12. The electronic apparatus of claim 1, wherein the electronic apparatus comprises a folding area that is foldable with respect to a virtual folding axis extending in one direction, a first non-folding area extending from a first side of the folding area, and a second non-folding area extending from a second side of the folding area, and the first side is opposite to the second side.

13. The electronic apparatus of claim 1, further comprising at least one of an input sensing panel and an optical member, wherein the at least one is disposed between the window and the display panel.

14. The electronic apparatus of claim 1, further comprising at least one of a lower film and a cushion layer, wherein the at least one is disposed below the display panel.

15. An electronic apparatus comprising:
a window;
a display panel disposed below the window;
a first sub-adhesive layer disposed below the display panel;
a first adhesive layer disposed below the first sub-adhesive layer;
a second adhesive layer disposed below the first adhesive layer; and
a digitizer disposed between the first adhesive layer and the second adhesive layer,
wherein the first sub-adhesive layer has a lower storage modulus than the first adhesive layer.

16. The electronic apparatus of claim 15, further comprising a second sub-adhesive layer disposed below the second adhesive layer,
wherein the second sub-adhesive layer has a lower storage modulus than the second adhesive layer.

17. A method for manufacturing an electronic apparatus, the method comprising:
disposing a display panel below a window; and
disposing a detection sensor unit below the display panel,
wherein the disposing of the detection sensor unit comprises:
stacking a digitizer between a first adhesive layer in a semi-cured state and a second adhesive layer in a semi-cured state;
increasing flatness of a first surface of each of the first adhesive layer and the second adhesive layer, wherein a second surface of each of the first adhesive layer and the second adhesive layer faces the digitizer, and the first surface is opposite to the second surface; and
providing light to the first adhesive layer and the second adhesive layer for full-curing.

18. The method of claim 17, wherein the increasing of the flatness of the first adhesive layer and the second adhesive layer includes providing heat to the first adhesive layer and the second adhesive layer.

19. The method of claim 17, further comprising forming a first sub-adhesive layer on the first adhesive layer.

20. The method of claim 19, further comprising forming a second sub-adhesive layer below the second adhesive layer.

* * * * *